United States Patent
Furukawa

(10) Patent No.: US 8,571,557 B2
(45) Date of Patent: Oct. 29, 2013

(54) RELAY STATION AND BASE STATION

(75) Inventor: Atsushi Furukawa, Anpachi-gun (JP)

(73) Assignee: Kyocera Corporation, Kyoto (JP)

( * ) Notice: Subject to any disclaimer, the term of this patent is extended or adjusted under 35 U.S.C. 154(b) by 170 days.

(21) Appl. No.: 13/060,262

(22) PCT Filed: Aug. 21, 2009

(86) PCT No.: PCT/JP2009/064677
§ 371 (c)(1),
(2), (4) Date: Jun. 21, 2011

(87) PCT Pub. No.: WO2010/024206
PCT Pub. Date: Mar. 4, 2010

(65) Prior Publication Data
US 2011/0237255 A1 Sep. 29, 2011

(30) Foreign Application Priority Data
Aug. 23, 2008 (JP) .............................. P2008-214721
Aug. 23, 2008 (JP) .............................. P2008-214724

(51) Int. Cl.
*H04W 36/00* (2009.01)

(52) U.S. Cl.
USPC ........................................................ 455/436

(58) Field of Classification Search
USPC ............. 455/11.1, 423, 7; 370/348, 278, 350, 370/349, 342, 401, 331, 338, 335, 491, 370/329; 375/267, 347
See application file for complete search history.

(56) References Cited

U.S. PATENT DOCUMENTS

| 2006/0046643 | A1 | 3/2006 | Izumikawa et al. |
| 2006/0281404 | A1 * | 12/2006 | Lee et al. ..................... 455/11.1 |
| 2008/0031197 | A1 * | 2/2008 | Wang et al. ................... 370/331 |
| 2008/0214182 | A1 * | 9/2008 | Wang et al. ................... 455/423 |
| 2008/0253300 | A1 * | 10/2008 | Wakabayashi et al. ....... 370/252 |
| 2008/0285502 | A1 * | 11/2008 | Deng et al. .................... 370/315 |

FOREIGN PATENT DOCUMENTS

| JP | 10-065601 | 3/1998 |
| JP | 2001-224064 | 8/2001 |
| JP | 2006-074325 | 3/2006 |
| KR | 20070000749 A | 1/2007 |

OTHER PUBLICATIONS

Office Action issued by the Korean Intellectual Property Office on Aug. 7, 2012; Korean Patent Application No. 10-2011-7006699; with translation.
WiMAX Forum; "Mobile WiMAX—Part 1: A Technical Overview and Performance Evaluation" Feb. 21, 2006.

* cited by examiner

*Primary Examiner* — Kiet Doan
(74) *Attorney, Agent, or Firm* — Studebaker & Brackett PC

(57) ABSTRACT

A relay station is capable of relaying communication between a radio communication terminal and a base station, and includes a communication quality acquisition unit which, when communication between the radio communication terminal and the base station is relayed, acquires communication quality in communication between the self-station and the radio communication terminal; an interference determination unit, which determines whether the communication between the self-station and the radio communication terminal is receiving interference based on the acquired communication quality; and an interference notification unit which, if it is determined that the communication is receiving interference, notifies the base station of interference information informing of the interference in order to prompt handover of a radio communication terminal, which is communicating with the base station.

27 Claims, 12 Drawing Sheets

RELAY STATION AND BASE STATION

TECHNICAL FIELD

The present invention relates to a relay station capable of relaying communication between a radio communication terminal and a base station, and a base station.

BACKGROUND ART

In recent years, radio communication terminals such as PHSs (Personal Handy phone System), portable telephones, and the like have been widely available, and it has been possible to make calls or obtain information anywhere and anytime. In particular, lately, as an amount of available information has shown steady growth, high speed and high quality radio communication systems have been introduced to download a large amount of data.

As one of the high-speed digital radio communication systems, there is an OFDMA (Orthogonal Frequency Division Multiplex Access) system represented by IEEE802.11 or WiMAX (registered trademark) (e.g., Non-Patent Document 1). The OFDMA system is one of data multiplexing systems, which effectively uses a frequency band by using a plurality of carriers on a unit time axis and making phases of signal waves orthogonal between adjacent carriers to partially overlap bands of the carriers. In addition, compared to an OFDM (Orthogonal Frequency Division Multiplexing) system, which assigns sub-channels in time division to individual users, the OFDMA system allows a plurality of users to share all sub-channels and assigns sub-channels having the highest transmission efficiency to each user.

If the above-described next-generation high-speed radio communication method, such as WiMAX, uses high frequency range of 2.5 GHz or higher, communication coverage for one base station is reduced in an area where the radio wave state is poor due to many obstacles or other causes. Thus, in order to cover all environments, a plurality of base stations need to be installed. In addition, since detouring of radio waves is suppressed, it is highly likely that the inside of a building is out of the communication coverage.

Accordingly, the technology for reducing a range of a service area, where communication with a base station is not available due to an effect of shadowing, which occurs from hiding by obstacles such as a building, or other causes, by installing a relay device for relaying the base station and a radio terminal device is disclosed (e.g., Patent Document 1)

BACKGROUND ART DOCUMENT

Patent Document

Patent Document 1: Japanese Patent Application Publication No. 2006-74325

Non-Patent Document

Non-Patent Document: "MobileWiMAX—Part I: A Technical Overview and Performance Evaluation" Prepared on Behalf of the WiMAX Forum, Feb. 21, 2006, http://www.intel.com/netcomms/technologies/wimax/WiMAX_Overview_v2.pdf

SUMMARY OF THE INVENTION

Problems to be Solved by the Invention

However, if a radio communication terminal A, which is communicating with the above-described relay station, and a radio communication terminal B, which is directly communicating with the base station, exist in the vicinity of the relay station, and if the distance between the terminals is very close, there is a possibility that interference occurs in one or both (between radio communication terminals) of the communication between the relay station and the radio communication terminal A and the communication between the base station and the radio communication terminal B.

FIG. 13 is an explanation view to explain interference occurring between radio communication terminals. For example, if the radio communication terminal A, which is communicating with the relay station, and the radio communication terminal B, which is directly communicating with the base station, are in the vicinity of the relay station, the state of a radio wave between the radio communication terminal A and the relay station is expected to be good, and the radio communication terminal A can communicate with the relay station through small transmission power 10. Meanwhile, in general, it is presumed that the vicinity of the relay station is distant from the base station, or it is difficult for a radio wave from the base station to reach the vicinity of the relay station. Thus, if the radio communication terminal B is located in the vicinity of the relay station, it means that the radio communication terminal B is located at a place distant from the base station. Accordingly, the radio communication terminal B communicates with the base station through considerably higher transmission power 12 than that of the radio communication terminal A. In this case, if frequency of a carrier wave used by the radio communication terminal A and the relay station and frequency of a carrier wave used by the radio communication terminal B and the base station are equal or adjacent to each other, there is a possibility that the radio communication terminal B using the high transmission power causes interference with the radio communication terminal A using the low transmission power over the frequency direction (presented by hatching in FIG. 13).

The present invention has been made in consideration of this problem, and an object is to provide a relay station and a base station, which are capable of suppressing interference with communication between a relay station and a radio communication terminal, by performing handover of a radio communication terminal causing the interference thereby performing proper communication connection.

Since the relay station secondarily supports communication between a radio communication terminal and a base station, the number of radio communication terminals, which can communicate with the relay station at the same time, is limited, compared to the base station. Accordingly, if the relay station actively performs communication with another radio communication terminal, which is an object of interference, communication with a radio communication terminal, which is located inside a building, and to which the relay station should be originally connected in order to accomplish the installation purpose of the relay station, may be restricted.

In order to effectively relay communication between a radio communication terminal located inside a building and a base station, in general, there are many cases that the relay station is installed at a boundary (by the window of a building or others) between the inside and the outside of the building. If the relay station is installed by the window, in most cases, the relay station can be seen well. Accordingly, the relay station becomes connected by other radio communication terminals located outside the building, so that communication with the radio communication terminal inside the building is restricted.

In consideration of this problem, another object of the present invention is to provide a relay station, which is capable of reliably accomplishing its original purpose, by determining whether a radio communication terminal requesting establishment of communication with the relay station is in a predetermined area, and preferentially connecting the radio communication terminal located in the predetermined area.

Means for Solving the Problems

In order to solve the above problems, a representative configuration according to the present invention relates to a relay station capable of relaying communication between a radio communication terminal and a base station, the relay station comprising: a communication quality acquisition unit which, when communication between the radio communication terminal and the base station is relayed, acquires communication quality in communication between the self-station and the radio communication terminal; an interference determination unit which determines whether the communication between the self-station and the radio communication terminal is receiving interference based on the acquired communication quality; and an interference notification unit which, if it is determined that the communication is receiving interference, notifies the base station of interference information informing of the interference in order to prompt handover of a radio communication terminal, which is communicating with the base station.

In order to solve the above problems, a representative configuration according to the present invention relates to a relay station capable of relaying communication between a radio communication terminal and a base station, the replay station comprising: a terminal communication unit which communicates with the radio communication terminal; a base station communication unit which communicates with the base station; and an inside and outside determination unit which, when receiving a communication connection request from a radio communication terminal, determines whether the radio communication terminal, which has made the communication connection request, is within a predetermined area, wherein the terminal communication unit preferentially establishes communication with the radio communication terminal, which is determined by the inside and outside determination terminal as being within the predetermined area.

In order to solve the above problems, a representative configuration according to the present invention relates to a base station which communicates with a relay station capable of relaying communication between the self-station and a radio communication terminal and with another radio communication terminal, the base station comprising: an interference reception unit which receives interference information informing that communication between the relay station and the radio communication terminal is receiving interference; a handover information transmission unit which, upon receiving the interference information, transmits handover information instructing another radio communication terminal, which is communicating with the self-station, to perform handover to the relay station; and a handover performing unit which performs handover from the self-station to the relay station, in response to a handover request from the another radio communication terminal.

Effect of the Invention

As described above, according to the relay station of the present invention, it is possible to suppress interference with a radio communication terminal communicating with a relay station, by performing handover of a radio communication terminal causing the interference thereby performing proper communication connection.

In addition, it is possible to reliably accomplish the original purpose of the relay station, by determining whether a radio communication terminal requesting establishment of communication with the relay station is in a predetermined area, and preferentially connecting the radio communication terminal located in the predetermined area.

DESCRIPTION OF EMBODIMENTS

Figure 1:
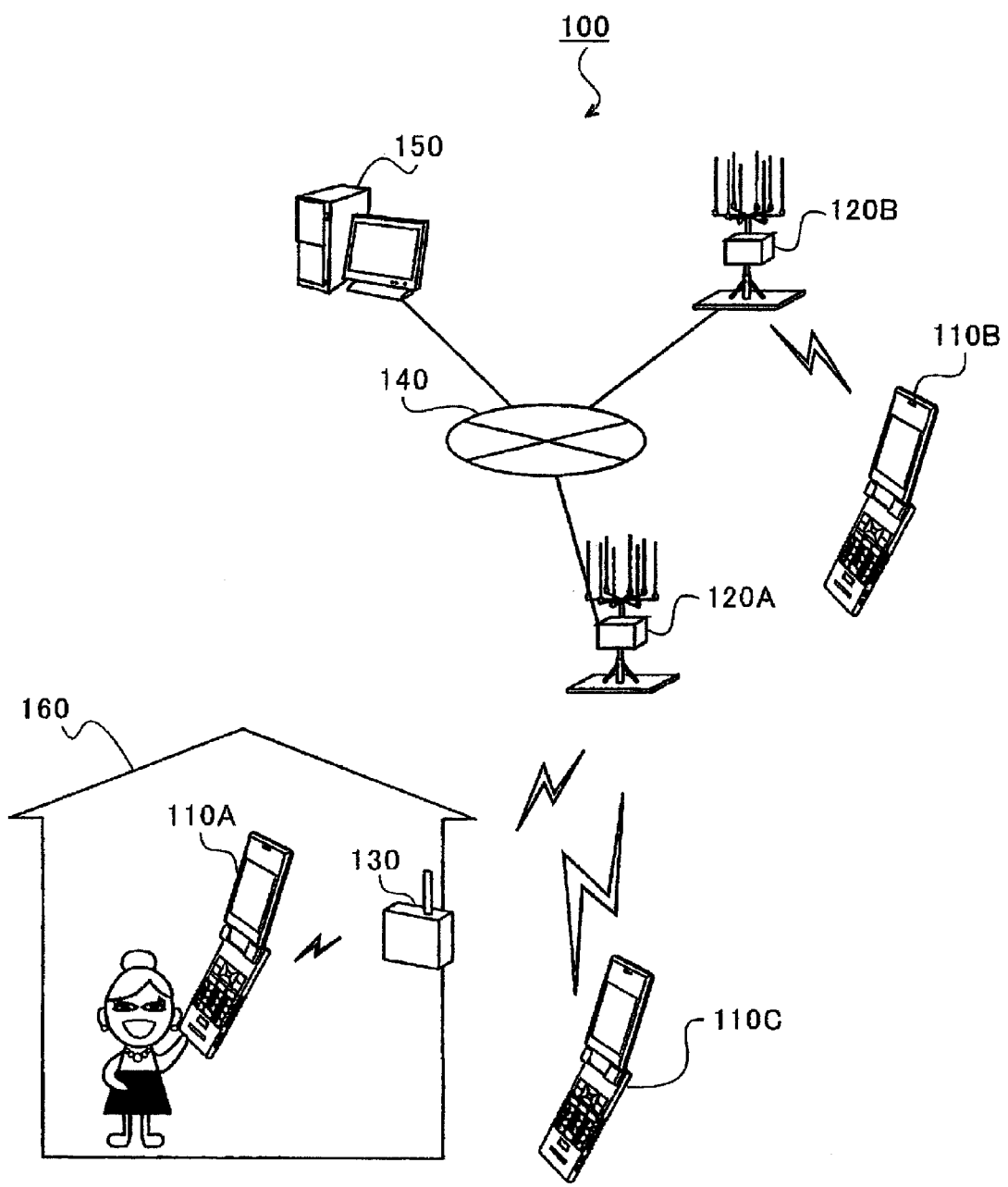
FIG. 1 is a block diagram showing general configuration of a radio communication system according to a first embodiment.

Hereinafter, preferable embodiments of the present invention will be described in detail, with reference to the accompanying drawings. In such embodiments, dimensions, materials, and other particular numerical values, etc., are merely exemplary to facilitate understanding of the invention and should not be construed as limiting the present invention thereto unless otherwise expressly described herein. Meanwhile, in this specification and the drawings, components having substantially the same function and configuration are denoted by the same reference numeral to omit repeated explanation, and components having no direct relationship with the present invention are not illustrated.

A radio communication terminal, which is represented by a PHS terminal, a portable telephone, and the like, configures a broadband radio communication system together with a plurality of base stations arranged with predetermined intervals, and performs communication with another radio communication terminal or a server on a communication network through the radio communication system.

Herein, in order to facilitate understanding of the embodiments that will be described below, general configuration of the radio communication system will first be described, and then detailed operation of the radio communication terminal, the base station, and the relay station will be described. Herein, for radio communication terminals, various electronic devices capable of performing radio communication, such as portable telephones, PHS terminals, note-type personal computers, PDAs (Personal Digital Assistant), digital cameras, music players, car navigators, portable televisions, game devices, DVD players, and remote controllers, may be used.

First Embodiment

Radio Communication System 100

FIG. 1 is a block diagram showing general configuration of a radio communication system according to a first embodiment. The radio communication system 100 is configured by a radio communication terminal 110 (110A, 110B, 110C), a base station 120 (120A, 120B), a relay station 130, a communication network 140 including an ISDN (Integrated Services Digital Network) line, Internet, and a private line, and the like, and a relay server 150.

In the radio communication system 100, when a user makes connection from his/her radio communication terminal 110A to another radio communication terminal 110B through a communication line, the radio communication terminal 110A makes a radio connection request to the base station 120A, which lies within communication coverage. Upon receiving the radio connection request, the base station 120A makes a request for communication connection to a communication counterpart (radio communication terminal 110B) to the relay server 150 through the communication network 140. The relay server 150 selects the base station 120B, which lies within the radio communication coverage of the radio communication terminal 110B, and thereby securing a communication path between the base station 120A and the base station 120B to establish communication between the radio communication terminal 110A and the radio communication terminal 110B.

In this case, if the radio communication method, i.e., the next-generation high-speed radio communication method, such as WiMAX, uses high frequency range of 2.5 GHz or higher, detouring of radio waves is suppressed. As such, if the radio communication terminal 110 is located in the inside of a building 160, which is a predetermined area, there is a high possibility that the terminal is out of the communication coverage. In the first embodiment, even in the case where the radio communication terminal 110 is located in the inside of a building, it is possible to enable the terminal to stably perform communicate with the base station 120, by installing and fixing the relay station 130 for relaying the base station 120 and the radio communication terminal 110 at a boundary between the inside and the outside of the building such as by the window of the building 160. In other words, the radio communication terminal 110 of the first embodiment can communicate with the relay station 130 and the base station 120.

However, if both the radio communication terminal 110A, which is communicating with the relay station 130, and the radio communication terminal 110C, which is directly communicating with the base station 120, exist in the vicinity of the relay station 130, and if the distance between the terminals (110A and 110C) is very close, there is a possibility that interference occurs in one or both of the communication between the relay station 130 and the radio communication terminal 110A and the communication between the base station 120 and the radio communication terminal 110C.

Herein, it is assumed that the radio communication terminal 110A, which is communicating with the relay station 130, and the radio communication terminal 110C, which is directly communicating with the base station 120, are located in the vicinity of the relay station 130. Under the circumstances, since the state of a radio wave between the radio communication terminal 110A and the relay station 130 is expected to be good, the radio communication terminal 110A can communicate with the relay station 130 through small transmission power. Meanwhile, in general, there are many cases where since a place where the relay station 130 is installed is distant from the base station 120, or due to other circumstances, it is difficult for a radio wave from the base station 120 to reach the place. If the radio communication terminal 110C is located in the vicinity of the relay station 130, it means that the radio communication terminal 110C is located at a place where a radio wave environment is poor, such as a place distant from the base station 120.

Accordingly, the radio communication terminal 110C communicates with the base station 120 through considerably higher transmission power than the radio communication terminal 110A. In this case, if frequency of a carrier wave used by the radio communication terminal 110A and the relay station 130, and frequency of a carrier wave used by the radio communication terminal 110C and the base station 120 are equal to or adjacent to each other, there is a possibility that the radio communication terminal 110C using the high transmission power causes interference with the radio communication terminal 110A using the low transmission power over the frequency direction.

In the first embodiment, it is possible to suppress interference with the radio communication terminal 110A communicating with the relay station 130, by handing over the radio communication terminal 110C causing the interference, thereby performing proper communication connection. Hereinafter, each of the radio communication terminal 110, the base station 120, and the relay station 130, which are components of the radio communication system 100, will be described.

(Radio Communication Terminal 110)

Figure 2:
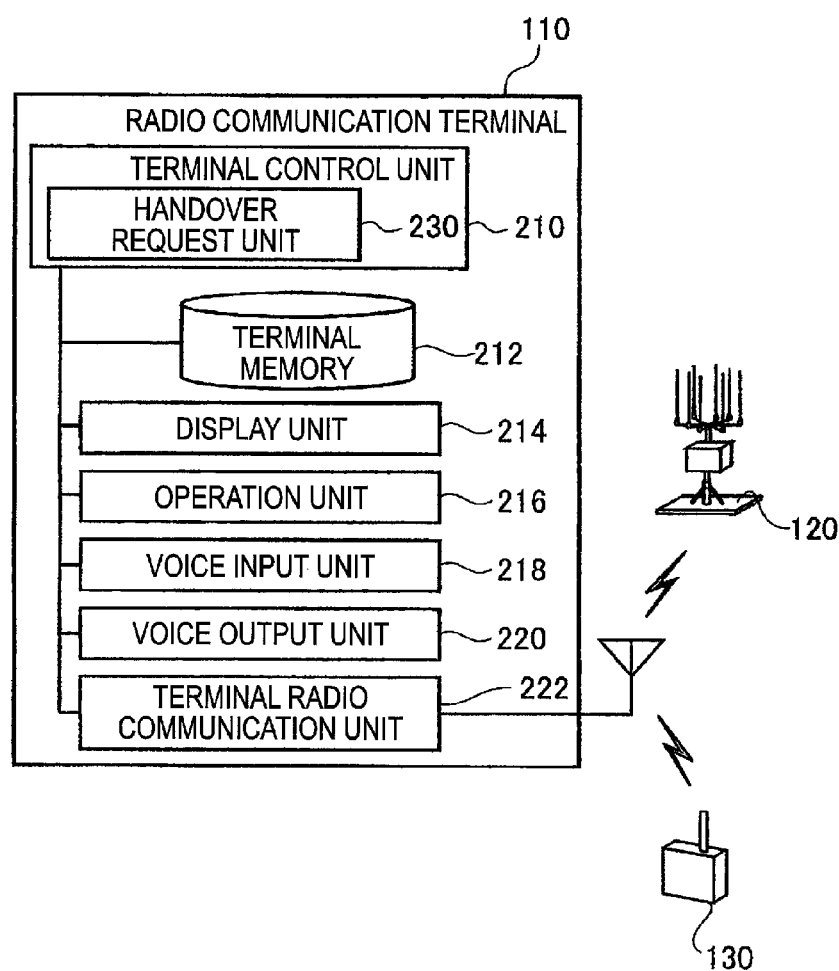
FIG. 2 is a functional block diagram showing hardware configuration of a radio communication terminal according to the first embodiment.
Figure 3:
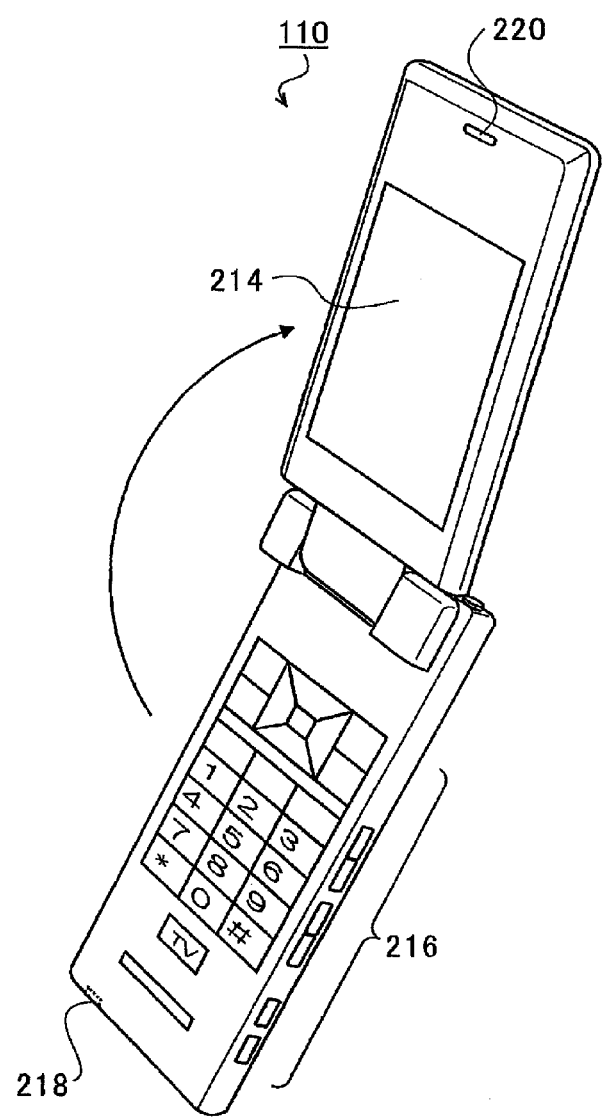
FIG. 3 is a perspective view showing the outer appearance of the radio communication terminal according to the first embodiment.

FIG. 2 is a functional block diagram showing hardware configuration of a radio communication terminal according to the first embodiment. FIG. 3 is a perspective view showing the outer appearance of the radio communication terminal. The radio communication terminal 110 is configured by a terminal control unit 210, a terminal memory 212, a display unit 214, an operation unit 216, a voice input unit 218, a voice output unit 220, and a terminal radio communication unit 222.

The terminal control unit 120 manages and controls the radio communication terminal 110 as a whole by means of a semiconductor integrated circuit including a central processing unit (CPU). The terminal control unit 210 also performs call function, mail transmitting and receiving function, imaging function, music playing function, and TV viewing function, by using programs of the terminal memory 212. The terminal control unit 210 also functions as a handover request unit 230 for requesting handover, in accordance with a handover command from the base station 120. The terminal memory 212 is configured by ROM, RAM, EEPROM, non-volatile RAM, flash memory, HDD, and so on, and stores programs processed in the terminal control unit 210, and voice data, etc.

The display unit 214 is configured by a liquid crystal display, an EL (Electro Luminescence) display, and so on, and can display Web contents or GUI (Graphical User Interface) of application, stored in the terminal memory 212 or provided from an application relay server (not illustrated) through the communication network 140. The operation unit 216 is configured by switches such as a keyboard, a cross key, and a joystick, and accepts user's operation input.

The voice input unit 218 is configured by voice recognition means such as a microphone, and converts user's voice input during call into an electric signal, which can be processed in the radio communication terminal 110. The voice output unit 220 is configured by a speaker and converts call counterpart's voice signal received in the radio communication terminal 110 into voice to output it. In addition, the voice output unit 220 can also output ringtones, operation sound of the operation unit 216, and alarm sound, etc.

The terminal radio communication unit 222 performs radio communication with the base station 120 or the relay station 130 in the communication network 140. The terminal radio communication unit 222 may employ various radio communication methods such as the OFDM system and the OFDMA system.

(Base Station 120)

Figure 4:
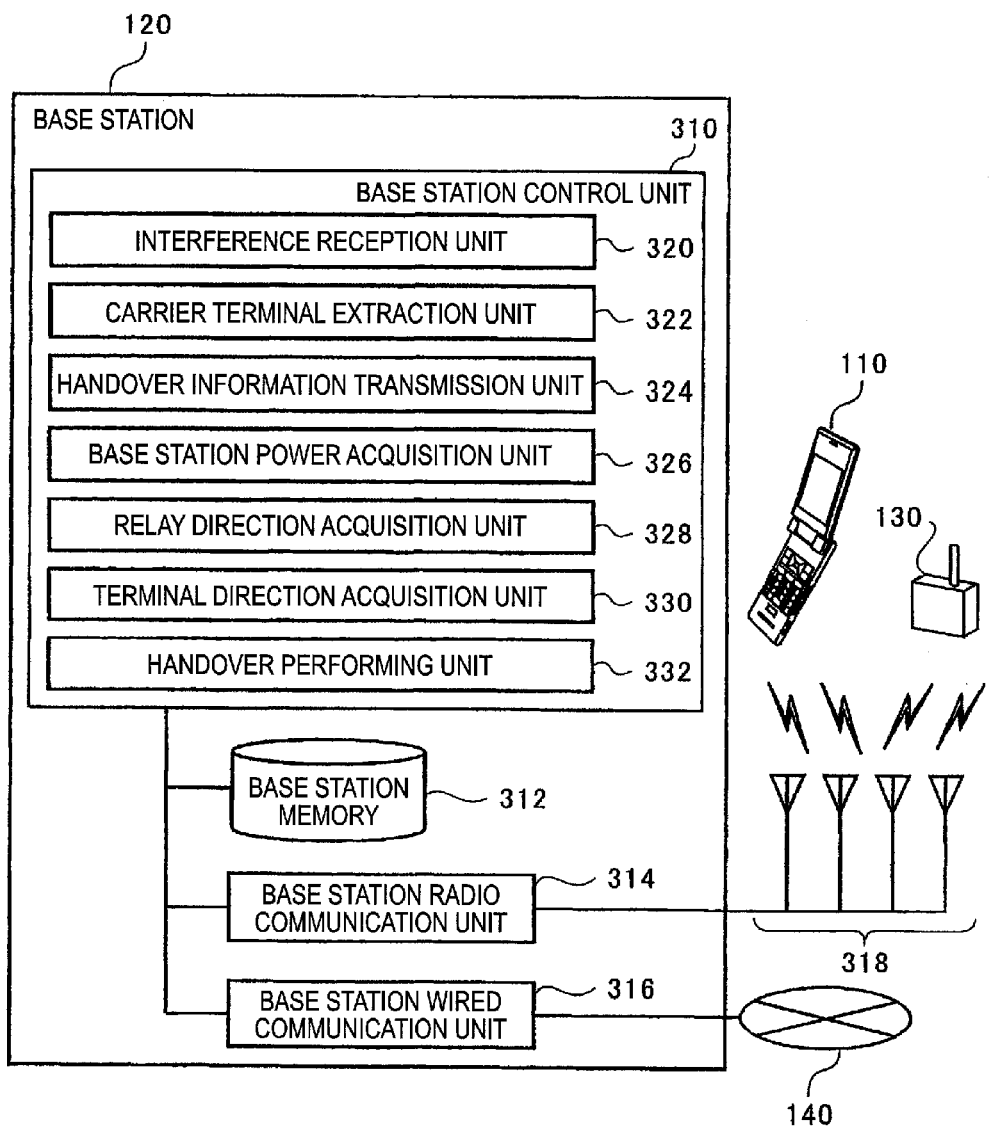
FIG. 4 is a block diagram showing general configuration of a base station according to the first embodiment.

FIG. 4 is a block diagram showing general configuration of a base station according to the first embodiment. The base station 120 is configured by a base station control unit 310, a base station memory 312, a base station radio communication unit 314, a base station wired communication unit 316, and a plurality of antennas 318 for performing adaptive array function.

The base station control unit 310 manages and controls the base station 120 as a whole by means of a semiconductor integrated circuit including a central processing unit (CPU). The base station memory 312 is configured by ROM, RAM, EEPROM, non-volatile RAM, flash memory, HDD, and so on, and stores programs processed in the base station control unit 310 and others.

The base station radio communication unit 314 establishes radio communication with the radio communication terminal 110 or the relay station 130, for example, through the OFDMA system. The base station radio communication unit 314 may adaptively alter a modulation method (adaptive modulation), depending on the state of communication with the radio communication terminal 110 or the relay station 130. The base station radio communication unit 314 also performs handover between the self-station (base station 120) and the relay station 130, in accordance with a handover request from the radio communication terminal 110. The base station wired communication unit 316 can connect various servers including the relay server 150 (refer to FIG. 1) through the communication network 140.

In the first embodiment, the base station control unit 310 also functions as an interference reception unit 320, a carrier terminal extraction unit 322, a handover information transmission unit 324, a base station power acquisition unit 326, a relay direction acquisition unit 328, a terminal direction acquisition unit 330, and a handover performing unit 322.

The interference reception unit 320 receives interference information transmitted by the relay station 130, informing that communication between the relay station 130 and the radio communication terminal 110 receives interference, through the base station communication unit 314.

When the interference reception unit 320 receives the interference information transmitted by the relay station 130, the carrier terminal extraction unit 322 extracts another radio communication terminal 110, which is communicating with the self-station (base station 120), by using a carrier wave of frequency, which is equal to or adjacent to the frequency of the carrier wave included in the interference information.

When the interference reception unit 320 receives the interference information from the relay station 130, the handover information transmission unit 324 transmits handover information to command another communication terminal 110, which is communicating with the self-station (base station 120), to be handed over to the relay station 130. In this case, the handover information transmission unit 324 may transmit handover information only for the radio communication terminal 110 extracted by the carrier terminal extraction unit 322.

According to the configuration where the handover information transmission unit 324 transmits handover information to another radio communication terminal 110 extracted by the carrier terminal extraction unit 322, the radio communication terminal 110, which is targeted to be prompted for handover, can be limited with frequency. Accordingly, load in the handover information transmission unit 324 can be reduced, and unnecessary handover can be restricted.

The base station power acquisition unit 326 acquires transmission power information including transmission power of another radio communication terminal 110, which is communicating with the self-station (base station 120), from the relay station 130 intermittently, namely, per predetermined time.

Additionally, in the first embodiment, the handover information transmission unit 324 may transmit handover information to the radio communication terminal 110, for which transmission power acquired by the base station power acquisition unit 326 exceeds a predetermined value, among the radio communication terminals 110 extracted by the carrier terminal extraction unit 322.

The vicinity of the relay station 130 is regarded as being distant from the base station 120. Accordingly, there is a high possibility that the radio communication terminal 110, which is distant from the base station 120, namely, which has high transmission power, is causing interference. In the first embodiment, the radio communication terminal 110, which is targeted to be prompted for handover, can be limited with transmission power. Accordingly, load in the handover information transmission unit 324 can be reduced, and unnecessary handover can be restricted.

The relay direction acquisition unit 328 acquires relay station direction information showing a direction of the relay station 130 by using the adaptive array function performed by means of the plurality of antennas 318.

The terminal direction acquisition unit 330 acquires terminal direction information showing a direction of another radio communication terminal 110, which is communicating with the self-station (base station 120), by using the adaptive array function performed by means of the plurality of antennas 318.

In the first embodiment, the handover information transmission unit 324 may transmit handover information to the radio communication terminal 110, for which transmission power acquired by the base station power acquisition unit 326 exceeds a predetermined value, and which is located in substantially the same direction as the direction of the relay station 130 based on the relay station direction information acquired by the relay direction acquisition unit 328 and the terminal direction information acquired by the terminal direction acquisition unit 330, among the radio communication terminals 110 extracted by the carrier terminal extraction unit 322.

According to this configuration, the radio communication terminal 110, which is targeted to be prompted for handover, can be limited with the direction from the base station 120, so that load in the handover information transmission unit 324 can be reduced, and unnecessary handover can be suppressed.

In the first embodiment, the handover information transmission unit 324 determines the radio communication terminal 110, to which handover information will be transmitted, based on the information acquired by the carrier terminal extraction unit 322, the base station power acquisition unit 326, the relay direction acquisition unit 328, and the terminal direction acquisition unit 330. However, the present invention is not limited to this embodiment. One or combination of two or more components selected from the carrier terminal extraction unit 322, the base station power acquisition unit 326, the relay direction acquisition unit 328, and the terminal direction acquisition unit 330 may be used.

For example, if another radio communication terminal 110 is determined based on the information acquired by the carrier terminal extraction unit 322 and the base station power acquisition unit 326, the handover information transmission unit 324 preferably transmits handover information to the radio communication terminal 110, for which transmission power acquired by the base station power acquisition unit 326 is the highest, or the radio communication terminal 110, for which the transmission power is up to a predetermined value from the highest level.

The handover performing unit 332 performs handover from the self-station (base station 120) to the relay station 130, in accordance with a handover request from another radio communication terminal 110.

As described above, according to the base station 120 of the first embodiment, it is possible to hand over another radio communication terminal 110 (object of interference), which is causing interference, to the relay station 130, which is communicating with the radio communication terminal 110 receiving the interference. Accordingly, carrier waves having the same frequency are not allocated, so that interference can be avoided. After the handover, communication with the relay station 130 is performed through small transmission power, so that the transmission power of the radio communication terminal 110 and the transmission power of another radio communication terminal 110 become substantially the same. Accordingly, even if frequency of a carrier wave used by the radio communication terminal 110, which is communicating with the relay station 130, has been adjacent to frequency of a carrier wave used by another radio communication terminal 110, the possibility that the terminals cause interference with each other can be reduced.

(Relay Station 130)

Figure 5:
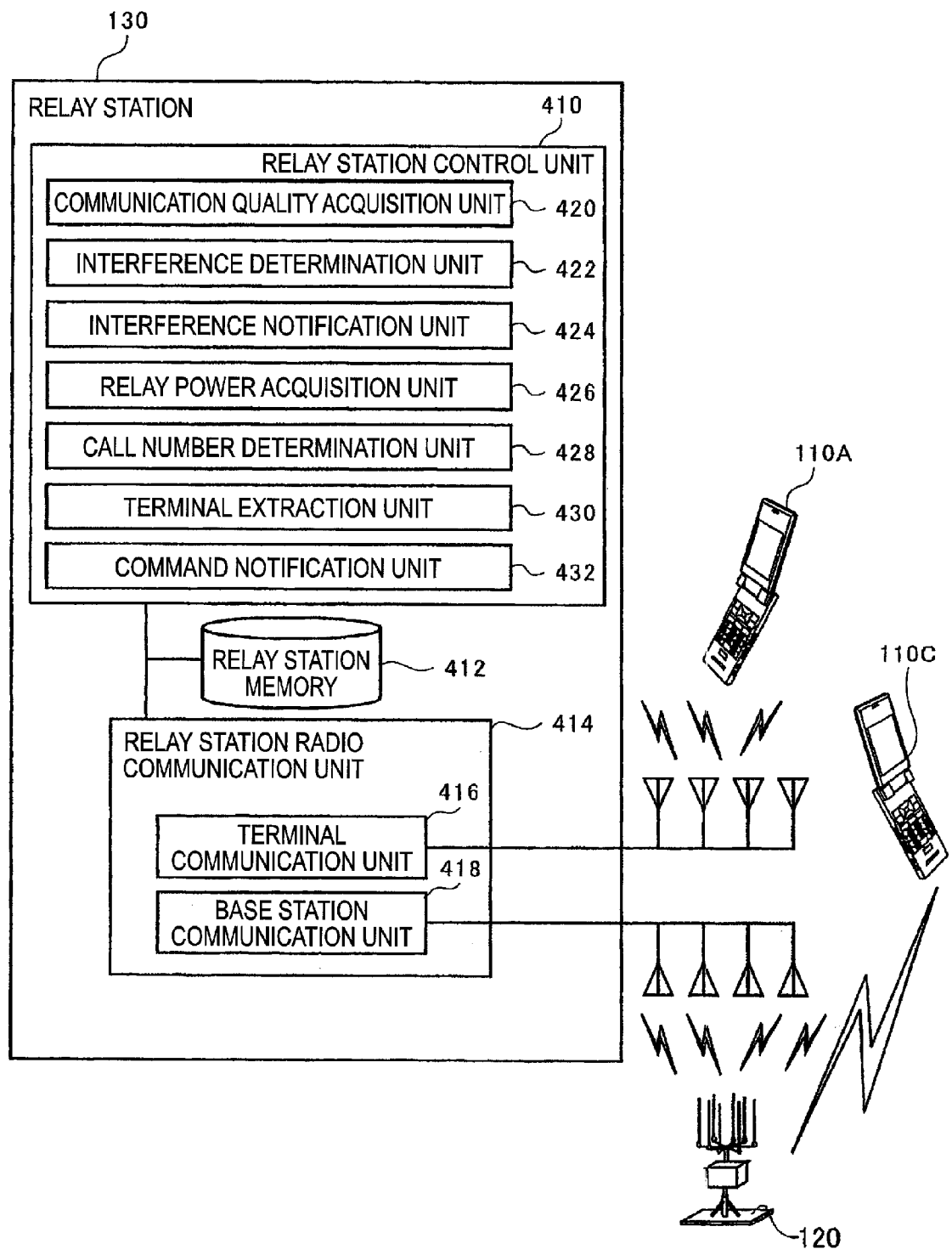
FIG. 5 is a block diagram showing general configuration of a relay station according to the first embodiment.

FIG. 5 is a block diagram showing general configuration of a relay station according to the first embodiment. The relay station 130 is configured by a relay station control unit 410, a relay station memory 412, and a relay station radio communication unit 414.

The relay station control unit 410 manages and controls the relay station 130 as a whole by means of a semiconductor integrated circuit including a central processing unit (CPU). The relay station memory 412 is configured by ROM, RAM, EEPROM, non-volatile RAM, flash memory, HDD, and so on, and stores programs processed in the relay station control unit 410, or others. The relay station radio communication unit 414 is configured by a terminal communication unit 416 for communicating with the radio communication terminal 110, and a base station communication unit 418 for communicating with the base station 120. The relay station radio communication unit 414 relays the radio communication terminal 110 and the base station 120. Accordingly, the relay station 130 functions as the radio communication terminal 110 in case of communicating with the base station 120. The base station 120 can treat the relay station 130 as the radio communication terminal. The terminal communication unit 416 may adaptively alter a modulation method (adaptive modulation), in accordance with the state of communication with the radio communication terminal 110.

In the first embodiment, the relay station control unit 410 also functions as a communication quality acquisition unit 420, an interference determination unit 422, an interference notification unit 424, a relay power acquisition unit 426, a call number determination unit 428, a terminal extraction unit 430, and a command notification unit 432.

When communication between the radio communication terminal 110 and the base station 120 is relayed, the communication quality acquisition unit 420 acquires communication quality in communication between the self-station (relay station 130) and the radio communication terminal 110. For example, in the first embodiment, communication quality in communication with the radio communication terminal 110A is acquired.

In the first embodiment, the communication quality acquisition unit 420 acquires RSSI and CINR as communication quality. By using RSSI and CINR, it is possible to properly determine communication quality. Meanwhile, herein, the communication quality acquisition unit 420 acquires RSSI and CINR as communication quality. However, communication quality can also be properly determined by acquiring RSSI and SINR.

The interference determination unit 422 determines whether the communication between the self-station (relay station 130) and the radio communication terminal 110 is receiving interference, based on the RSSI and CINR acquired by the communication quality acquisition unit 420 as communication quality. In the first embodiment, if SINR/RSSI, as the relationship of SINR and RSSI, or CINR/RSSI, as the relationship of CINR and RSSI, meets a predetermined condition, for example, if SINR/RSSI or CINR/RSSI is less than a predetermined value, the interference determination unit 422 determines that the communication between the self-station (relay station 130) and the radio communication terminal 110 is receiving interference. Specifically, if CINR/RSSI is less than a predetermined value, the interference determination unit 422 of the first embodiment determines that the communication between the self-station (relay station 130) and the radio communication terminal 110 is receiving interference. For example, in the first embodiment, it is determined whether communication with the radio communication terminal 110A is receiving interference.

RSSI is radio wave strength of all received radio waves. CINR is a desired carrier to interference and noise ratio. Accordingly, if CINR/RSSI is less than a predetermined value, whether the communication is receiving interference can be reliably determined.

If the communication quality acquisition unit 420 acquires RSSI and SINR as communication quality, and if SINR/RSSI is less than a predetermined value, the interference determination unit 422 determines that the communication between the self-station (relay station 130) and the radio communication terminal 110 is receiving interference. Since SINR is a desired signal to interference and noise ratio, it is possible to determine whether the communication with the radio communication terminal 110 is receiving interference, as in the case where CINR/RSSI is used to determine interference.

If the interference determination unit 422 determines that the communication with the radio communication terminal 110 is receiving interference, in order to prompt the radio communication terminal 110, which is communicating with the base station 120, to be handed over to the self-station (relay station 130), the interference notification unit 424 notifies interference information informing of the interference to the base station 120 through the base station communication unit 418. For example, in the first embodiment, if the interference determination unit 422 determines that the communication with the radio communication terminal 110A is receiving interference, in order to prompt the radio communication terminal 110C, which is communicating with the base station 120, to be handed over to the self-station (relay station 130), the interference notification unit 424 notifies interference information informing of the interference to the base station 120 through the base station communication unit 418.

In the first embodiment, the interference notification unit 424 notifies the interference information, which includes frequency of a carrier wave and a time slot used in the communication between the radio communication terminal 110 and the self-station (relay station 130), to the base station 120.

Accordingly, it is possible to notify the base station 120 to hand over another radio communication terminal 110 using frequency substantially equal to or adjacent (or in the vicinity of) to frequency of a carrier wave of the radio communication terminal 110, which is communicating with the relay station 130, as a carrier wave to the self-station (relay station 130). Accordingly, it is possible to prompt only another radio communication terminal 110, which is highly likely to have caused interference with the radio communication terminal 110, to be handed over to the self-station (relay station 130), so that interference can be effectively avoided.

In addition, it is possible to notify the base station 120 to hand over another radio communication terminal 110 using a time slot substantially same or adjacent to a time slot used by the radio communication terminal 110, which is communicating with the relay station 130, to the self-station (relay station 130). Accordingly, in case of a radio communication method using the TDMA scheme, it is possible to prompt only another radio communication terminal 110, which is highly likely to have caused interference with the radio communication terminal 110, to be handed over to the self-station (relay station 130).

The relay power acquisition unit 426 acquires transmission power information including transmission power of the radio communication terminal 110, which is communicating with the self-station (relay station 130). For example, in the first embodiment, the relay power acquisition unit 426 acquires transmission power information including transmission power of the radio communication terminals 110A and 110C.

When there is a communication connection request from the radio communication terminal 110, which is not communicating with the self-station (relay station 130), the call number determination unit 428 determines whether calls being in communication with the self-station (relay station 130) exceed a predetermined number. "Calls" are, for example, channels, and PRUs (Physical Resource Unit) in WiMAX or the like.

If the call number determination unit 428 determines that calls being in communication exceed the predetermined number, the terminal extraction unit 430 extracts a predetermined radio communication terminal 110, based on the transmission power information acquired by the relay power acquisition unit 426.

The command notification unit 432 notifies command information to prompt handover on the radio communication terminal 110 extracted by the terminal extraction unit 430, to the base station 120 through the base station communication unit 418. The command notification unit 432 transmits a command to prompt handover on the radio communication terminal 110 extracted by the terminal extraction unit 430, to the base station 120.

According to the configuration of the relay power acquisition unit 426, the call number determination unit 428, the terminal extraction unit 430, and the command notification unit 432 as described above, when the relay station 130 is communicating with calls exceeding the predetermined number, the radio communication terminal 110, which is distant from the relay station 130, namely, which is short in distance from other base stations whereby it can be estimated that the handover effect can be easily obtained, is preferentially handed over, so that individual proper radio communications can be established. As a result, interference with the radio communication terminal 110, which is communicating with the relay station 130, can be suppressed.

As described above, according to the relay station 130 of the first embodiment, if it is determined that the radio communication terminal 110, which is communicating with the self-station (relay station 130), is receiving interference, it is possible to prompt handover on another radio communication terminal 110, which is an object of the interference, to establish communication with the self-station (relay station 130). As a result, the radio communication terminal 110, which is receiving interference, and another radio communication terminal 110 (object of the interference), which is causing the interference, can communicate with the same relay station 130. Accordingly, carrier waves of the same frequency are not allocated, so that interference can be avoided.

In addition, it is possible to hand over another radio communication terminal 110 (object of the interference), which is causing the interference, to the relay station 130 in the vicinity thereof, compared to the base station 120 being in communication. Accordingly, the possibility that a good communication environment is obtained is high, and consumption power can be suppressed. Accordingly, even if frequency of a carrier wave used by the radio communication terminal 110 has been adjacent to frequency of a carrier wave used by another radio communication terminal 110, the radio communication terminal 110 and another radio communication terminal 110 become performing communication through substantially the same transmission power.

Accordingly, the possibility that the terminals cause interference with each other can be reduced.

(Radio Communication Method)

Hereinafter, a radio communication method for performing radio communication by using the radio communication terminal 110, the base station 120, and the relay station 130 will be described in detail.

Figure 6:
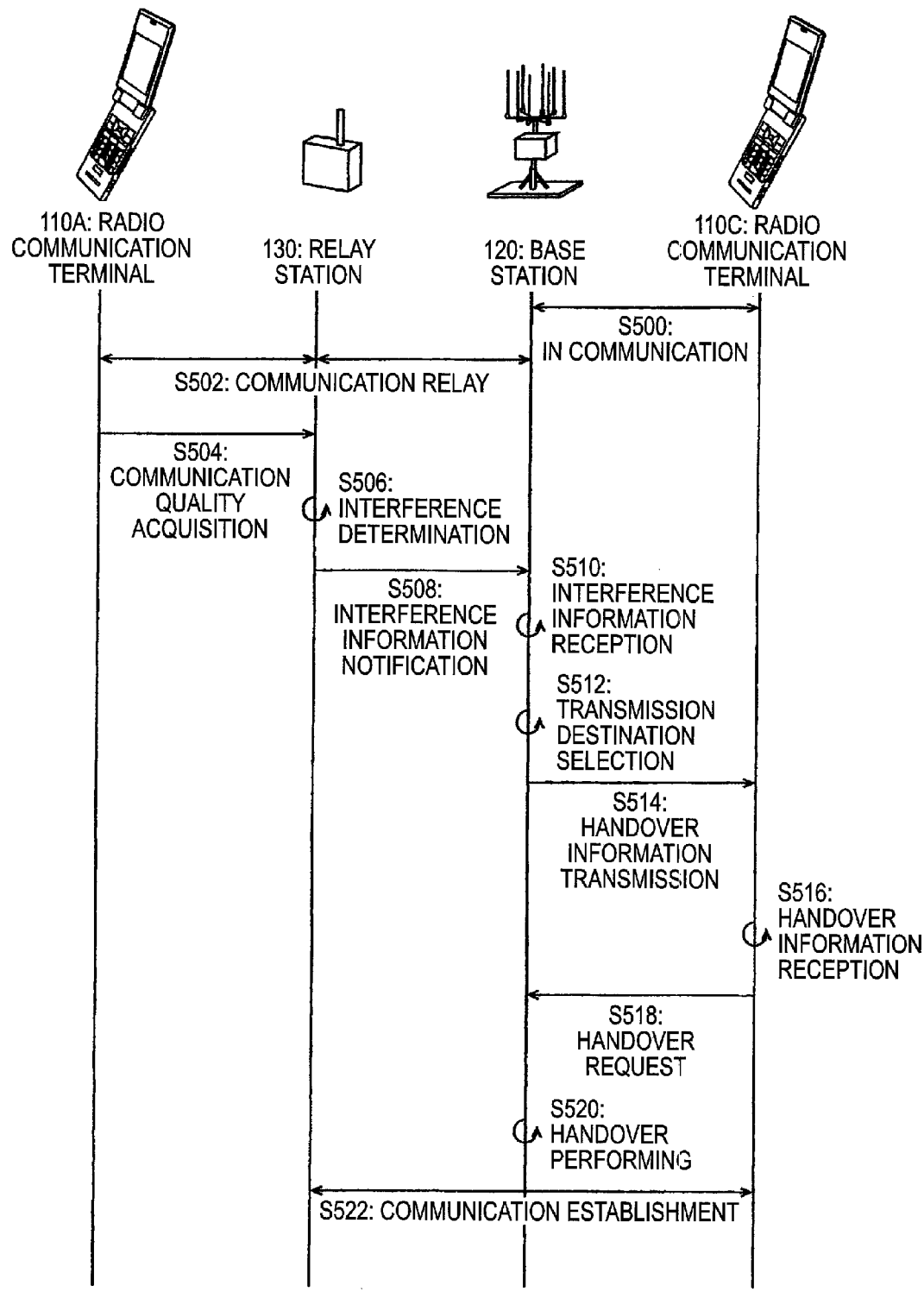
FIG. 6 is a sequence view showing process of a radio communication method according to the first embodiment.

FIG. 6 is a sequence view showing processes of a radio communication method according to the first embodiment. For example, in the first embodiment, the radio communication terminal 110A, which is communicating with the relay station 130, and another radio communication terminal 110C, which is communicating with the base station 120, will be described.

When another radio communication terminal 110C located in the vicinity of the relay station 130 is communicating with the base station 120 (S500: communication step), and the relay station 130 relays communication between the radio communication terminal 110A and the base station 120 (S502: communication relay step), the communication quality acquisition unit 420 of the relay station 130 acquires communication quality in communication between the self-station (relay station 130) and the radio communication terminal 110A (S504: communication quality acquisition step).

Based on the communication quality acquired in the communication quality acquisition step S504, the interference determination unit 422 of the relay station 130 determines whether the communication between the self-station (relay station 130) and the radio communication terminal 110A is receiving interference (S506: interference determination step). If it is determined that the communication is receiving interference, in order to prompt handover on another radio communication terminal 110C, which is communicating with the base station 120, the interference determination unit 422 notifies interference information informing of the interference to the base station 120 (S508: interference information notification step).

When the interference reception unit 320 of the base station 120 receives the interference information (S510: interference information reception step), the handover information transmission unit 324 selects a radio communication terminal 110C, to which handover information will be transmitted, among other communication terminals 110, which are communicating with the self-station (base station 120), based on the information acquired by the carrier terminal extraction unit 322, the base station power acquisition unit 326, the relay direction acquisition unit 328, and the terminal direction acquisition unit 330 (S512: transmission destination selection step).

Handover information to command the radio communication terminal 110C selected in the transmission destination selection step S512 to be handed over to the relay station 130 is transmitted (S514: handover information transmission step).

When the radio communication terminal 110C, which is communicating with the base station 120, receives the handover information (S516: handover information reception step), the handover request unit 230 of the radio communication terminal 110C transmits a handover request to the base station 120 (S518: handover request step).

In accordance with the handover request from the radio communication terminal 110C, the handover performing unit 332 of the base station 120 performs handover from the self-station (base station 120) to the relay station 130 (S520: handover performing step). Establishment of communication between the relay station 130 and the radio communication terminal 110C is performed (S522: communication establishment step).

As described above, in the radio communication method of the first embodiment, if it is determined that communication between the relay station 130 and the radio communication terminal 110 is receiving interference, it is possible to prompt handover on another radio communication terminal 110, which is a object of the interference, to establish communication with the relay station 130. Accordingly, the radio communication terminal 110, which is receiving interference, and another radio communication terminal 110 (object of the interference), which is causing the interference, can communicate with the same relay station 130. Accordingly, after the handover, communication with the relay station 130 is performed through small transmission power, so that the transmission power of the radio communication terminal 110 and the transmission power of another communication terminal 110 become substantially the same. Accordingly, even if frequencies of carrier waves used by the radio communication terminal 110 and another radio communication 110 have been adjacent to each other, the possibility that the terminals cause interference with each other can be reduced.

Second Embodiment

The first embodiment has described the radio communication system 100, the base stations 120, the relay station 130, and the radio communication method, which are capable of suppressing interference with the radio communication terminal 110 communicating with the relay station 130, by handing over another radio communication terminal 110 causing the interference, thereby performing proper communication connection.

However, the relay station 130 secondarily supports communication with the radio communication terminal 110 and the base station 120. Thus, compared to the base station 120, the number of the radio communication terminals 110 or calls, which can communicate with the relay station 130 at the same time, is limited. If the relay station 130 actively performs communication with another radio communication terminal 110, which is an object of interference, communication with the radio communication terminal 110 located in a predetermined area, to which the relay station should be originally connected, may be restricted. For example, in the second embodiment, communication with the radio communication terminal 110 located in the inside of a building where the relay station 130 is installed may be restricted.

There are many cases where the relay station 130 is installed at a boundary (by the window of the building 160 or others) between the inside of a moving object or a building and the outside of the moving object or the building, in order to effectively relay communication between the radio communication terminal 110 located in the inside of a moving object or a building and the base station 120. If the relay station 130 is installed by the window, in most cases, the relay station 120 can be seen well. As such, the relay station 130 is connected by another radio communication terminal 110 located outside the moving object or the building, so that communication with the radio communication terminal 110 located in the inside of the moving or the building is restricted.

The second embodiment describes a relay station and a radio communication method, which are capable of reliably accomplishing the original purpose of the relay station, by determining whether a radio communication terminal requesting establishment of communication with the relay station is in a predetermined area, and preferentially connecting the radio communication terminal located in the predetermined area.

(Relay Station 600)

Figure 7:
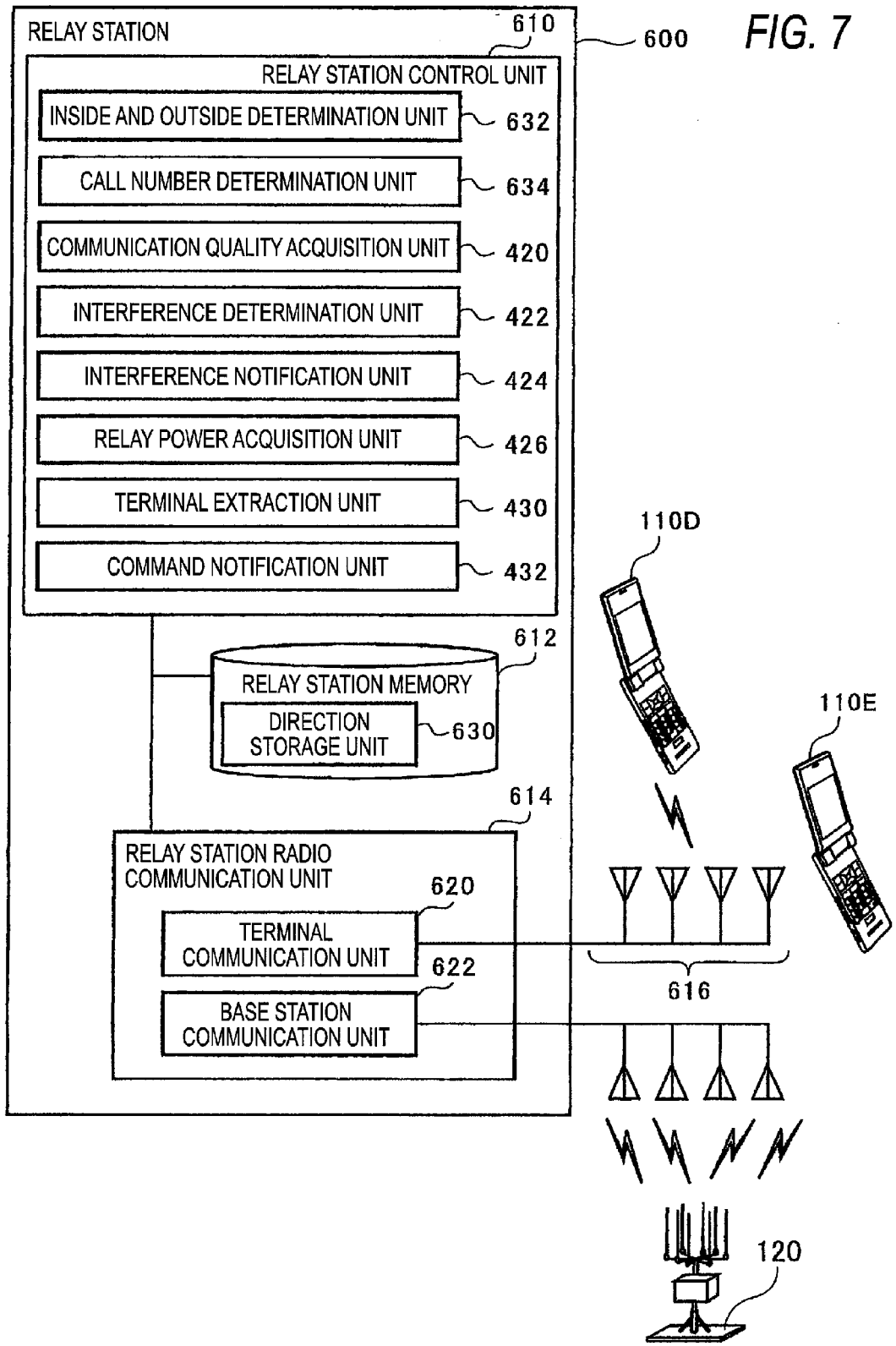
FIG. 7 is a block diagram showing general configuration of a relay station according to a second embodiment.

FIG. 7 is a block diagram showing general configuration of a relay station according to the second embodiment. Components, which are substantially the same as those of the relay station 130 described above, are denoted by the same reference numerals as used for the components of the relay station 130 to omit repeated explanation.

As shown in FIG. 7, the relay station 600 is configured by a relay station control unit 610, a relay station memory 612, a relay station radio communication unit 614, and a plurality of antennas 616 for performing the adaptive array function. As in the first embodiment described above, the relay station radio communication unit 614 is configured by a terminal communication unit 620 for communicating with the radio communication terminal 110, and a base station communication unit 622 for communicating with the base station 120. The relay station radio communication unit 614 relays the radio communication terminal 110 and the base station 120.

In the second embodiment, the plurality of antennas 616 and the relay station memory 612 functioning as a direction storage unit 630, which will be described later, are in an integrated form. However, the present invention is not limited to this embodiment. The plurality of antennas 616 and the relay station memory 612 may be in a form of separate components.

The relay station control unit 610 manages and controls the relay station 600 as a whole by means of a semiconductor integrated circuit including a central processing unit (CPU). The relay station memory 612 is configured by ROM, RAM, EEPROM, non-volatile RAM, flash memory, HDD, and so on, and stores programs processed in the relay station control unit 610, and others. In the second embodiment, the relay station memory 612 also functions as the direction storage unit 630. The direction storage unit 630 stores in advance information specifying a direction representing a direction of the predetermined area, and a direction representing the outside of the predetermined area. For example, in the second embodiment, the direction storage unit 630 stores, in advance, information specifying a direction representing a direction of the predetermined area, i.e., a direction representing a direction of the inside of a building or a moving object, in which the relay station 600 is installed, and information specifying a direction representing the outside of the predetermined area, i.e., a direction representing the outside of a building or a moving object, in which the relay station 600 is installed.

In the second embodiment, the relay station control unit 610 also functions as a communication quality acquisition unit 420, an interference determination unit 422, an interference notification unit 424, a relay power acquisition unit 426, a terminal extraction unit 430, a command notification unit 432, an inside and outside determination unit 632, and a call number determination unit 634.

When there is a communication connection request from the radio communication terminal 110, the inside and outside determination unit 632 determines whether the radio communication terminal 110, which has made the communication access request, is in the predetermined area, namely, in the inside of a building, in which the relay station 600 is installed. The inside and outside determination unit 632 also determines whether the radio communication terminals 110 that are in established communication include a radio communication terminal 110 located outside a building (outside the predetermined area).

In the second embodiment, the inside and outside determination unit 632 determines whether the radio communication terminal 110, which has made the communication connection request, is located in the predetermined area (the inside of a building), depending on whether the direction of the radio communication terminal 110, which has made the communication connection request, as extracted by the adaptive array function performed by means of the plurality of antennas 616 is included in the direction specifying the predetermined area (the inside of a building) based on the information specifying a direction representing the predetermined area (the inside of a building) and a direction representing the outside of the predetermined area (the outside of a building) as stored in the direction storage unit 630.

By using the adaptive array function performed by means of the plurality of antennas 616, the inside and outside determination unit 632 can exactly extract the direction of the radio communication terminal 110. The relay station 600 simply compares the direction extracted by the adaptive array function, with a direction representing the predetermined area (the inside of a building) and a direction representing the outside of the predetermined area (the outside of a building) as stored in advance, such that it is possible to easily and reliably determine whether the terminal is in the predetermined area (the inside of a building).

The relay station 600 relays communication between the radio communication terminal 110, which is located in a place where direct communication with the base station 120 is difficult, such as the inside of a moving object or a building, and the base station 120. Accordingly, there are many cases where the relay station 600 is installed by the window of the building 160, namely, at a boundary between the inside and the outside of a building. Accordingly, if a direction representing the inside of a building and a direction representing the outside of a building for an installation place of the relay station 600 and installed equipment are stored in advance, even if the distance from the relay station 600 to the radio communication terminal 110 is arbitrary, it can be easily determined whether the radio communication terminal 110 is located in the inside of a building, as long as the direction of the radio communication terminal 110 can be extracted.

For example, in the second embodiment, the terminal communication unit 620 described above preferentially establishes communication with the radio communication terminal 110D, which is determined by the inside and outside determination unit 632 to be located in the predetermined area (inside the building).

When there is a communication connection request from the radio communication terminal 110, the call number determination unit 634 determines whether calls being in communication with the self-station (relay station 600) exceed a first predetermined number.

In the second embodiment, if the call number determination unit 634 determines that calls being in communication with the self-station (relay station 600) exceed the first predetermined number, for example, 70% of allowable calls of the radio communication terminal 110, the terminal communication unit 620 refuses establishment of communication with the radio communication terminal 110, which is determined by the inside and outside determination unit 632 to not be located in the predetermined area (the inside of a building). For example, in the second embodiment, establishment of communication with the radio communication terminal 110E is refused.

Accordingly, in case of being in communication with calls exceeding the first predetermined number, establishment of communication with the radio communication terminal 110D, which is not located in the predetermined area (the inside of a building), namely, is located outside the predetermined area (the outside of a building) can be refused. In other words, in case of being in communication with calls exceeding the first predetermined number, it is possible to allow only communication with the radio communication terminal 110C located in the predetermined area (the inside of a building). Accordingly, it is possible to prevent the number of the radio communication terminals 110, which can communicate with the relay station 600, from being limited by radio communication terminals 110, which are located outside the predetermined area (the outside of a building).

In the second embodiment, the call number determination unit 634 also determines whether calls being in communication with the self-station (relay station 600) exceed a second predetermined number, which is larger than the first predetermined number, for example, 95% of allowable calls of the radio communication terminal 110.

If the call number determination unit 634 determines that calls being in communication with the self-station (relay station 600) exceed the second predetermined number, the terminal communication unit 620 prompts the radio communication terminal 110, which is determined by the inside and outside determination unit 632 to not be located in the predetermined area (the inside of a building), and in the established communication, to be handed over with other base stations.

Accordingly, in case of being in establishment of communication (during communication) with calls exceeding the second predetermined number, which is larger than the first predetermined number, it is possible to exclude communication between the radio communication terminal 110 located outside the predetermined area (outside a building) and the relay station 600, from the radio communication terminals 110, which are in established communication. Accordingly, the relay station 600 can secure communicable calls as many as the number of the disconnected calls outside the predetermined area (outside a building). The relay station 600 can allocate the calls to the radio communication terminal 110 in the inside of the predetermined area (the inside of a building).

As described above, according to the relay station 600 of the second embodiment, it is possible to reliably accomplish the original purpose of the relay station, by determining whether the radio communication terminal 110 requesting establishment of communication with the self-station (relay station 600) is in the predetermined area, and preferentially connecting the radio communication terminal 110 located in the predetermined area.

(Radio Communication Method)

Hereinafter, a radio communication method for performing radio communication by using the radio communication terminal 110, the base station 120, and the relay station 600 will be described in detail.

Figure 8:
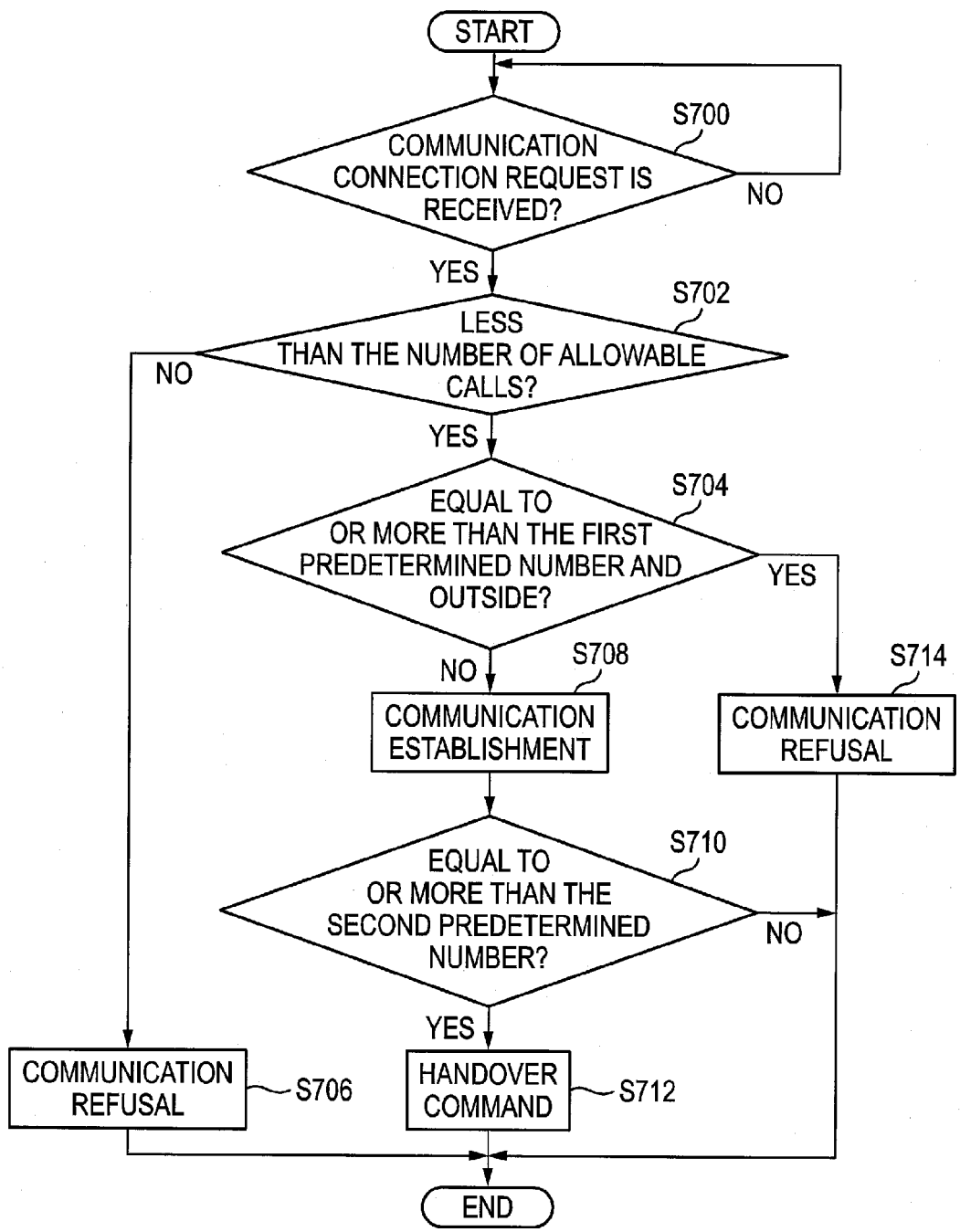
FIG. 8 is a flowchart showing processes of a radio communication method according to the second embodiment.

FIG. 8 is a flow chart showing processes of a radio communication method according to the second embodiment.

When there is a communication connection request from the radio communication terminal 110 (YES of S700: communication access reception step), the call number determination unit 634 determines whether calls being in communication with the self-station (relay station 600) are less than the number of allowable calls of the relay station 600 (S702: determination step of the number of allowable calls). In case of being less than the number of allowable calls (YES of S702), the call number determination unit 634 additionally determines whether the number of calls being in communication with the self-station (relay station 600) is more than the first predetermined number. The inside and outside determination 632 determines whether the radio communication terminal 110, which is attempting the communication establishment, is outside the predetermined area (outside a building, in which the relay station is installed) (S704: inside and outside determination step).

Meanwhile, in the determination step of the number of allowable calls S702, if the number of calls being in communication with the self-station (relay station 600) is the number of allowable calls of the relay station 600, communication establishment of the radio communication terminal 110, which is attempting the communication establishment, is refused (S706: communication refusal step).

In the inside and outside determination step S704, (a) if the number of calls being in communication with the self-station (relay station 600) is below the first predetermined number, and (b) if the number of calls being in communication with the self-station (relay station 600) is more than the first predetermined number, and the inside and outside determination unit 632 determines that the radio communication terminal 110, which is attempting the communication establishment, is located in the predetermined area (the inside of a building) (NO of S704), communication of the radio communication terminal 110 is established (S708: communication establishment step).

Additionally, the call number determination unit 634 determines whether the number of calls being in communication with the self-station (relay station 600) exceeds the second predetermined number (S710: determination step of the second predetermined number). In case of being more than the second predetermined number (YES of S710), the terminal communication unit 620 commands handover information to prompt the radio communication terminal 110, which is communicating with the self-station (relay station 600) and located outside the predetermined area (outside a building), to be handed over with other base stations (S712: handover command step).

In the inside and outside determination step S704, if the number of calls being in communication with the self-station (relay station 600) is more than the first predetermined number, and if the inside and outside determination unit 632 determines that the radio communication terminal 110, which is attempting the communication establishment, is located outside the predetermined area (outside a building) (YES of S704), the communication is refused (S714: communication refusal step).

As described above, according to the radio communication method of the second embodiment, it is possible to preferentially establish communication with the radio communication terminal 110 located in the predetermined area (the inside of a building). Accordingly, it is possible to avoid the circumstance that the relay station 600 is occupied by the radio communication terminal 110 located outside the predetermined area (outside a building), so that the original purpose of the relay station as a relay device for relaying communication between the radio communication terminal 110 located in the inside of the predetermined area (the inside of a building) and the base station 120 cannot be accomplished.

Other Embodiments

In the second embodiment described, whether the radio communication terminal 110, which has made a communication connection request, is located in the predetermined area (the inside of a building) is determined, depending on whether the direction of the radio communication terminal 110, which has made the communication connection request, as extracted by the adaptive array function performed by means of the plurality of antennas 616 is included in the direction representing the predetermined area based on the information specifying a direction representing the predetermined area and a direction representing the outside of the predetermined area as stored in the direction storage unit 630.

Hereinafter, the configuration where it is possible to determine whether the radio communication terminal 110, which has made the communication connection request, is located in the predetermined area (the inside of a building) even without the need of the plurality of antennas 616 capable of performing the adaptive array function, will be described.

(Relay Station 800)

Figure 9:
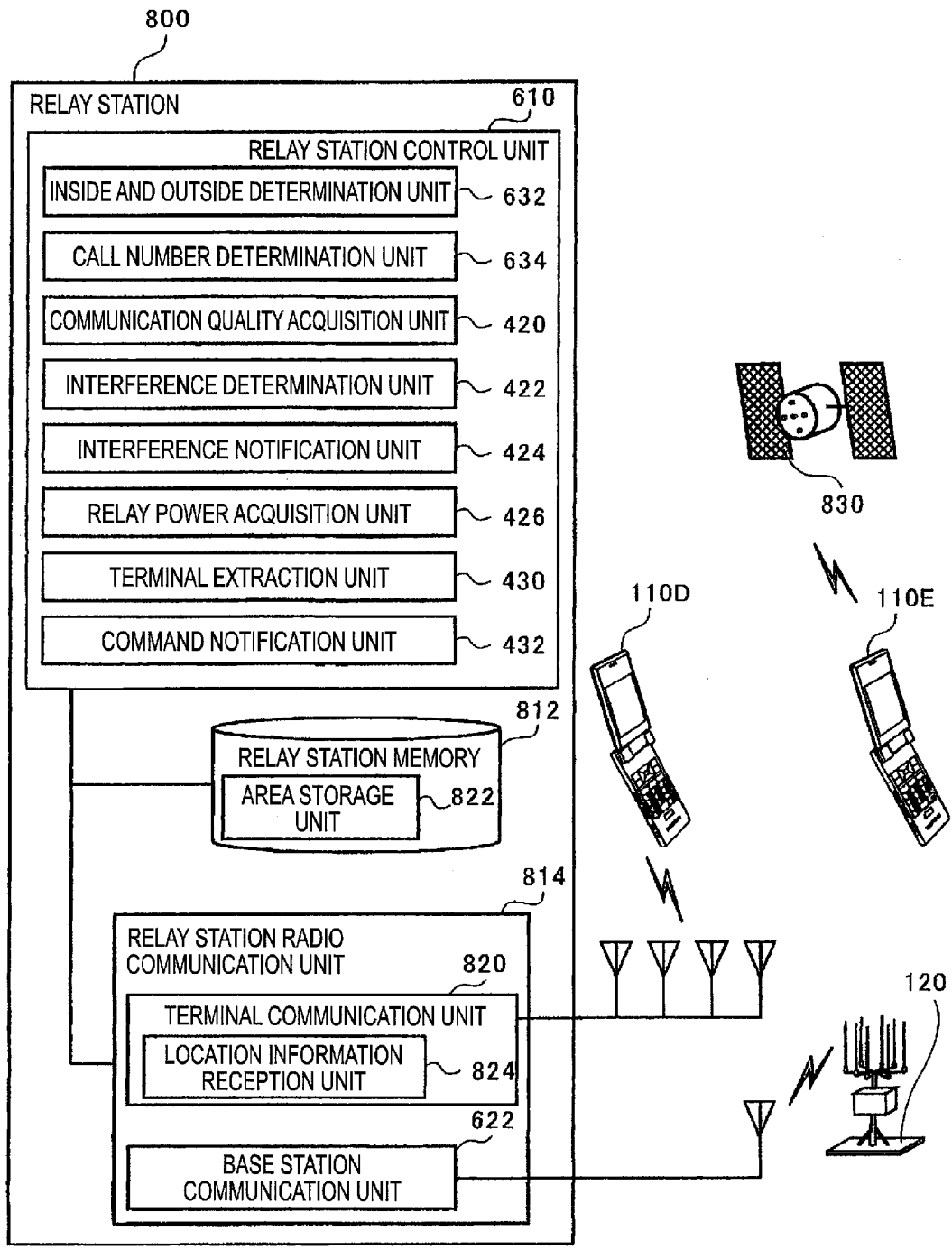
FIG. 9 is a block diagram for explaining another configuration of a relay station.

FIG. 9 is a block diagram for explaining another configuration of the relay station. Components, which are substantially the same as those of the relay stations 130 and 600, are denoted by the same reference numerals as used for the components of the relay stations 130 and 600 to omit repeated explanation.

As shown in FIG. 9, the relay station 800 is configured by a relay station control unit 610, a relay memory 812, which functions as an area storage unit 822, and a relay station radio communication unit 814. As in the first and second embodiments described above, the relay station radio communication unit 814 is configured by a terminal communication unit 820 for communicating with the radio communication terminal 110, and a base station communication unit 622 for communicating with the base station 120. The relay station radio communication unit 814 relays the radio communication terminal 110 and the base station 120.

The area storage unit 822 stores predetermined area information as a range of the predetermined area (the inside of a building, in which the relay station 800 is installed). For example, in this embodiment, the relay station 800 is installed and fixed on a wall at a boundary between the inside and the outside of a building, such as by the window of the building 160. Accordingly, the area storage unit 822 stores predetermined area information in advance as a range of the inside of a building.

Figure 10:
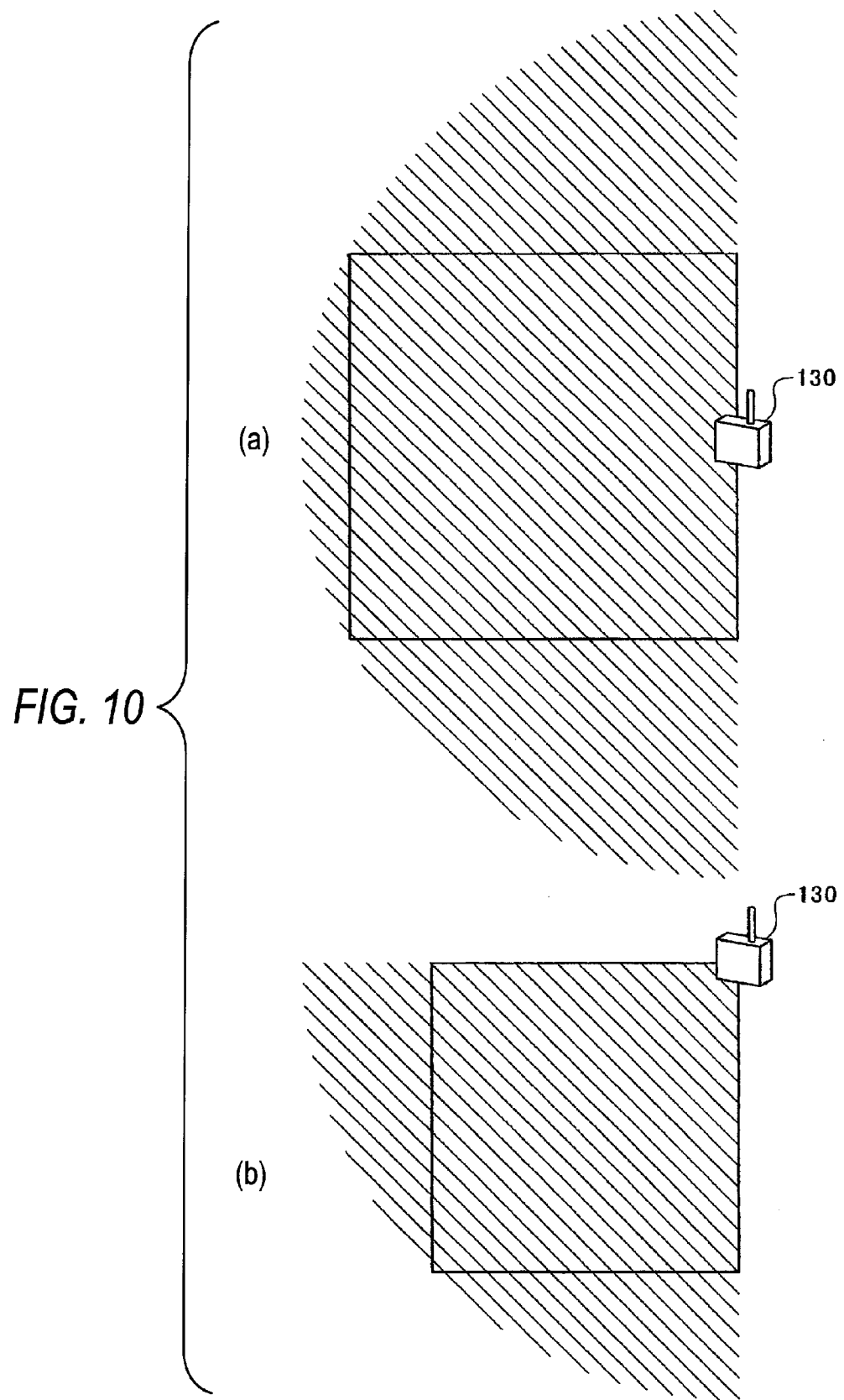
FIG. 10 is an explanation view for explaining a range of the inside of a building as a range of a predetermined area.

FIG. 10 is an explanation view to explain a range of the inside of a building as a range of the predetermined area. If the relay station 800 is installed by the window as shown in FIG. 10(*a*), a range of the inside of a building is preferably the range of the approximately semicircle presented by hatching in FIG. 10(*a*). Meanwhile, if the relay station 800 is installed in an approximately corner of the building 160, a range of the inside of a building may be the range presented by hatching in FIG. 10(*b*).

In this case, for the absolute location of the self-station (relay station 800), location information of the self-station (relay station 800) may be acquired from a GPS satellite. If the relay station 800 is installed and fixed in a building, location information may be preferably registered in advance at that time.

In this embodiment, the terminal communication unit 820 also functions as a location information reception unit 824. The location information reception unit 824 receives location information acquired by the radio communication terminal 110 from a GPS satellite 830.

In this embodiment, the inside and outside determination unit 632 determines whether location of the radio communication terminal 110 based on the location information received by the location information reception unit 824 for the radio communication terminal 110, which has made the communication connection request, is within the range of the inside of a building shown in the predetermined area information stored in advance in the area storage unit 822.

Accordingly, whether the radio communication terminal 110 is in the predetermined area (the inside of a building) can be determined, depending on whether the radio communication terminal 110 is located within the range of the predetermined area (the inside of a building), which is targeted by the self-station (relay station 800).

Meanwhile, if the radio communication terminal 110 is in the inside of a building, location information cannot be acquired from the GPS satellite 830. Accordingly, the inside and outside determination unit 632 may determine whether the radio communication terminal 110 is outside the building, depending on whether the location information reception unit 824 receives location information before predetermined time.

Meanwhile, in the relay station 850, the inside and outside determination unit 632 determines whether location of the radio communication terminal 110 based on the location information of the radio communication terminal 110, which has made the communication connection request, is within the range of the inside of a building shown in the predetermined area information stored in advance in the area storage unit 822. However, the inside and outside determination unit 632 may determine that the radio communication terminal 110 is outside a building if the distance between the radio communication terminal 110 and the self-station (relay station 800) as obtained from the location information received from the radio communication terminal 110 and the location information of the self-station (relay station 800) is more than a predetermined value. In this case, the distance from the location of the relay station 850 to the outside of the building, in which the self-station (relay station 800) is installed, may be set in advance as the predetermined value.

Accordingly, it is possible to determine that the radio communication terminal 110 cannot exist in the predetermined area (the inside of a building), depending on the distance between the relay station 800 (self-station) and the radio communication terminal 110. Accordingly, it is possible to easily and quickly determine whether the radio communication terminal 110 is in the predetermined area (the inside of a building).

(Relay Station 850)

Figure 11:
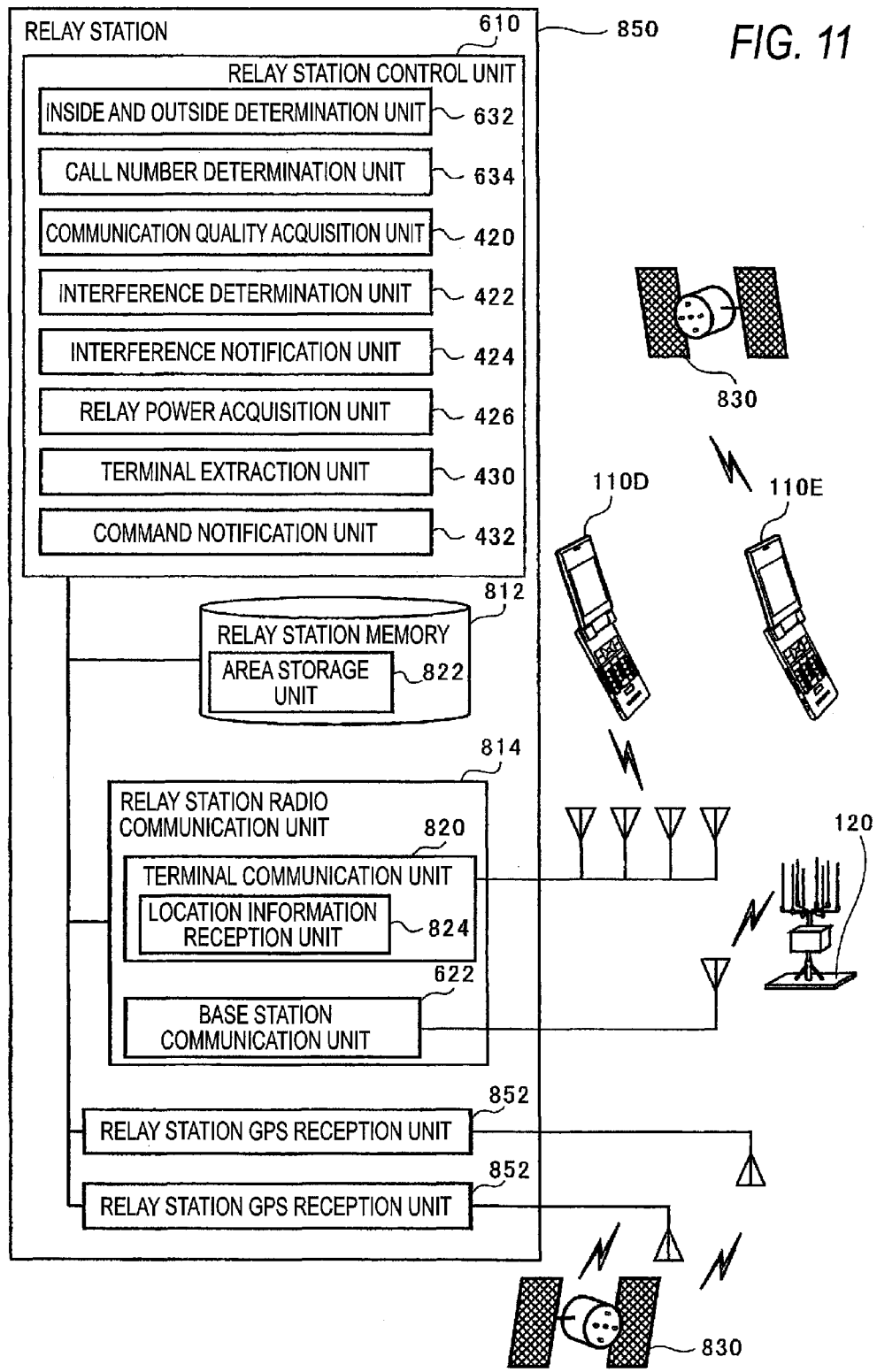
FIG. 11 is a block diagram for explaining another configuration of the relay station.

FIG. 11 is a block diagram for explaining another configuration of the relay station. Components, which are substantially the same as those of the relay stations 130, 600, and 800, are denoted by the same reference numerals as used for the components of the relay stations 130, 600, and 800 to omit repeated explanation.

The relay station 850 is configured by two relay station GPS reception units 852, in addition to the components of the relay station 800. Herein, the relay station 850 is installed in a moving object including a vehicle, into which a person can take, such as a car, a bus, a subway (train), a vessel, and an airplane.

The relay station GPS reception units 852 receive location information from the GPS satellite 830. And, predetermined area information stored by an area storage unit 822 of the relay station 850 is determined based on relative location to the two relay station GPS reception units 852.

Figure 12:
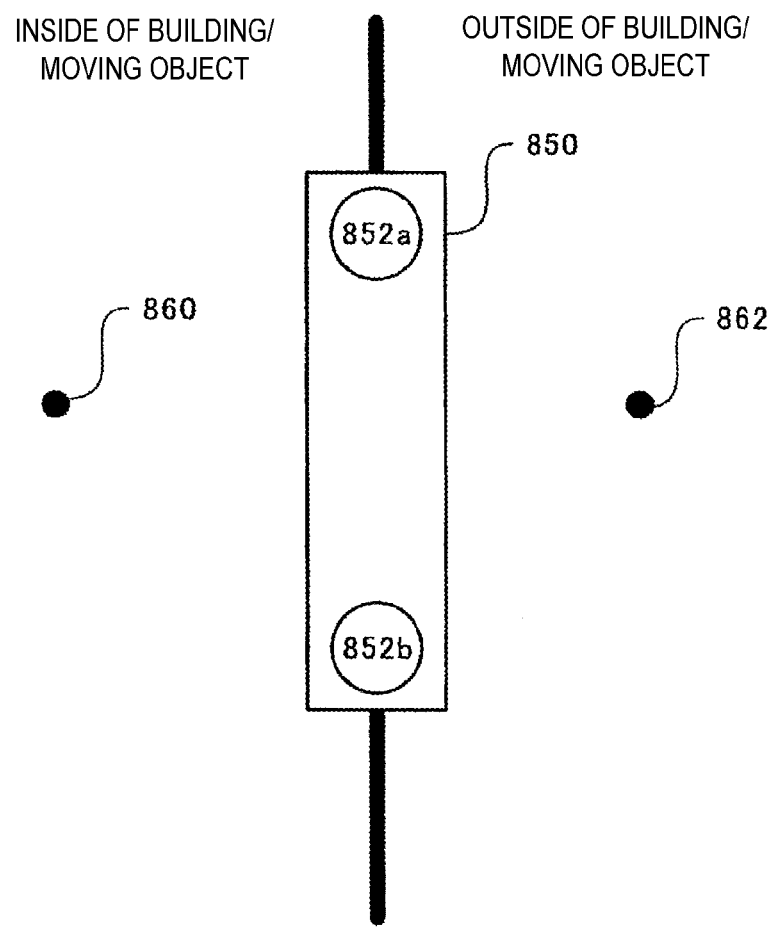
FIG. 12 is an explanation view for explaining determination on predetermined area information based on relative location to a relay station GPS reception unit.
Figure 13:
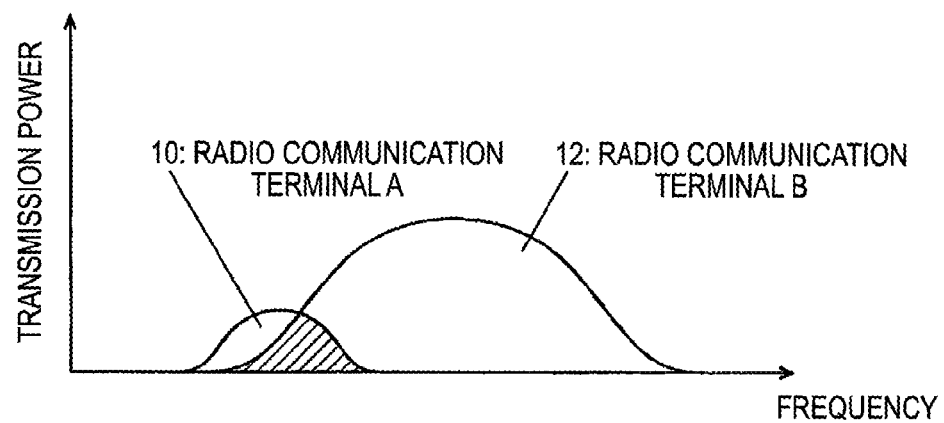
FIG. 13 is an explanation view for explaining interference occurring between radio communication terminals.

FIG. 12 is an explanation view for explaining determination of predetermined area information based on relative location to the relay station GPS reception units.

As shown in FIG. 12, the relay station GPS reception units 852 (presented by 852*a* and 852*b* in FIG. 12) of the relay station 850 are installed on an approximately boundary (presented by lines in FIG. 12) between the predetermined area (the inside of a moving object) and the outside of the predetermined area (the outside of a moving object). For example, if the left side of FIG. 12 is the predetermined area (the inside of a moving object), and the right side is the outside of the predetermined area (the outside of a moving object), the area storage unit 822 stores, as predetermined area information, information showing that the position of the left side based on the relay station GPS reception unit 852*a* is the predetermined area (the inside of a moving object), and the position of the right side is the outside of the predetermined area (the outside of the moving object), when viewed at the relative location to the two relay station GPS reception units 852, namely, the position of the relay station GPS reception unit 852*b*.

In this case, if the location information of the radio communication terminal 110 as received by the location information reception unit 824 is a place 860, since the place 860 is at the position of the left side based on the relay station GPS reception unit 852*a* when viewed at the position of the relay station GPS reception unit 852*b*, the inside and outside determination unit 632 determines that the radio communication terminal 110 is in the predetermined area (the inside of a moving object). Meanwhile, if the location information of the radio communication terminal 110 as received by the location information reception unit 824 is a place 862, since the place 860 is at the position of the right side based on the relay station GPS reception unit 852*a* when viewed at the position of the relay station GPS reception unit 852*b*, the inside and outside determination unit 632 determines that the radio communication terminal 110 is outside the predetermined area (outside a moving object).

According to the configuration where the range of the predetermined area (the inside of a moving object), which is targeted by the self-station (relay station 850), is determined based on relative location to the two or more relay station GPS reception units 852 of the self-station (relay station 850), even if the relay station 850 is installed in a moving object including a vehicle, into which a person can take, such as a car, a bus, a subway (train), a vessel, and an airplane, and the absolute location of the inside of the moving object varies moment by moment, the range of the predetermined area (the inside of a moving object) can be easily and reliably defined.

The preferable embodiments of the present invention have been described with reference to the accompanying drawings. However, there is no need to say that the present invention is not limited to the embodiments. One of ordinary skill in the art can make various modified or altered embodiments within the scope described in the claims. The modified or altered embodiments are construed as being within the technical scope of the present invention.

For example, it is possible to construct the radio communication system of the present invention by employing high-speed digital radio communication (e.g., WiMAX and next-generation PHS) using the OFDM or OFDMA system. In that case, the radio communication terminal or the relay station has communication function corresponding to the OFDM or OFDMA system.

In the embodiments that have been described, the relay station is installed and fixed in a building. However, the present invention is not limited to the embodiments. The relay station may be installed in a moving object. A moving object means a vehicle, into which a person can take, such as a car, a bus, a subway (train), a vessel, and an airplane. The predetermined area is the inside of a moving object.

In the embodiments that have been described, the relay station determines whether the radio communication terminal is receiving interference. However, the base station may determine whether the radio communication terminal is receiving interference, by acquiring communication quality from the relay station.

In the embodiments that have been described, if it is determined that communication between the self-station (relay station) and the radio communication terminal is receiving interference, interference information is notified only to the base station, which is communicating with another radio communication terminal (object of interference) causing the interference. However, interference information may be notified to the base station, which is communicating with another radio communication terminal (object of interference), and furthermore other base stations adjacent to the base station through the base station.

The steps in the radio communication method described in this specification do not need to be sequentially performed in the order described in one or both of the sequence view or the flow chart and may be performed in parallel or by subroutine.

As described in detail above, a representative configuration of an embodiment of the present invention relates to a relay station capable of relaying communication between a radio communication terminal and a base station, the relay station including: a communication quality acquisition unit which, when communication between the radio communication terminal and the base station is relayed, acquires communication quality in communication between the self-station and the radio communication terminal; an interference determination unit which determines whether the communication between the self-station and the radio communication terminal is receiving interference based on the acquired communication quality; and an interference notification unit which, if it is determined that the communication is receiving interference, notifies the base station of interference information informing of the interference in order to prompt handover of a radio communication terminal which is communicating with the base station.

According to this configuration, if it is determined that the communication between the self-station (relay station) and the radio communication terminal is receiving interference, it is possible to prompt handover of another radio communication terminal, which is an object of the interference, to establish communication with the self-station. Accordingly, the radio communication terminal, which is receiving interference, and another radio communication terminal (object of interference), which is causing the interference, can communicate with the same relay station. Accordingly, carrier waves of the same frequency are not allocated, so that interference can be avoided.

If the radio communication terminal is in the vicinity of the relay station, and another radio communication terminal, which is directly communicating with the base station, is also in the vicinity of the relay station, it is highly likely that communication between the relay station and the radio communication terminal is receiving interference. Since a radio wave environment becomes good in the case where the distance between the radio communication terminal and the relay station is short, the radio communication terminal can suppress consumption power, so that it can communicate with the relay station through small transmission power. Meanwhile, if another radio communication terminal, which is directly communicating with the base station, is also in the vicinity of the relay station, it is located at a place distant from the base station or a place to which a radio wave from the base station cannot easily reach. Accordingly, another radio communication terminal communicates with the base station through considerably higher transmission power than that of the radio communication terminal, which is communicating with the relay station. In this case, if frequency of a carrier wave (carrier) used by the radio communication terminal and the relay station, and frequency of a carrier wave used by the other radio communication terminal and the base station are adjacent to each other, there is a possibility that another radio communication terminal causes interference with the radio communication terminal over the frequency direction.

However, according to an embodiment of the present invention, it is possible to perform handover of another radio communication terminal, which is causing interference, namely, which is an object of interference, to a relay station located in the vicinity thereof. Accordingly, there is a high possibility that a good communication environment is obtained, and consumption power can be suppressed. Accordingly, even if frequencies of carrier waves used by the radio communication terminal and another radio communication terminal are adjacent to each other, the terminals can perform communication through small transmission power, so that the possibility that they cause interference with each other can be reduced.

If it is determined that the radio communication terminal is receiving interference, the interference notification unit may notify the base station and another base station adjacent to the base station of the interference information informing of the interference in order to prompt handover of an radio communication terminal, which is communicating with the base station.

If it is determined that communication between the self-station (relay station) and the radio communication terminal is receiving interference, interference information informing of the interference is notified to the base station, which is communicating with another radio communication terminal causing the interference, and other base stations adjacent to the base station. Accordingly, it is possible to reliably prompt handover of another radio communication terminal, which is a object of the interference, to establish communication with the relay station. Accordingly, the radio communication terminal, which is receiving interference, and another radio communication terminal (object of the interference), which is causing the interference, can communicate with the same relay station. Accordingly, carrier waves of the same frequency are not allocated, so that interference can be avoided.

The communication quality acquired by the communication quality acquisition unit may be an RSSI, and one of an SINR or a CINR.

By using RSSI (Received Signal Strength Indicator), and SINR (Signal to Interference and Noise Ratio) or CINR (Carrier to Interference and Noise Ratio), it is possible to properly determine communication quality.

If a relationship of SINR and RSSI or a relationship of CINR and RSSI meets a predetermined condition, the interference determination unit of the relay station may determine that the communication between the self-station and the radio communication terminal is receiving interference.

RSSI is radio wave strength of all received radio waves. CINR is a desired carrier to interference and noise ratio. Accordingly, if the relationship of SINR and RSSI or the relationship of CINR and RSSI meets a predetermined condition, it can be reliably determined whether the communication is receiving interference.

The interference notification unit of the relay station may notify the base station of the interference information including a frequency of a carrier wave or a time slot used in the communication between the radio communication terminal and the self-station.

According to this configuration, it is possible to notify the base station to perform handover of another radio communication terminal using a frequency substantially equal to or adjacent to a frequency of a carrier wave of the radio communication terminal, which is communicating with the relay station, as a carrier wave to the self-station (relay station 130). Accordingly, it is possible to prompt only another radio communication terminal, which is highly likely to cause interference with communication between the self-station (relay station) and the radio communication terminal, to be handed over to the self-station (relay station), so that interference can be effectively avoided.

In addition, it is possible to notify the base station to perform handover of another radio communication terminal using a time slot substantially same as or adjacent to a time slot used in the radio communication terminal, which is communicating with the relay station, to the self-station (relay station).

The relay station may further include a relay power acquisition unit which intermittently acquires transmission power information including transmission power of the radio communication terminal, which is communicating with the self-station; a terminal extraction unit which if it is determined that the number of calls exceeds the predetermined number, extracts a radio communication terminal based on the transmission power information acquired by the relay power acquisition unit; and a command notification unit which notifies the base station of command information to prompt handover of the extracted radio communication terminal.

According to this configuration, when the relay station is communicating with calls exceeding a predetermined number, the radio communication terminal, which is distant from the relay station, namely, which is short in distance from other base stations whereby it can be estimated that the handover effect can be easily obtained, is preferentially handed over. Accordingly, proper radio communications can be established, respectively. As a result, interference with communication between the relay station and the radio communication terminal can be suppressed. In this case, calls mean channels or PRUs (Physical Resource Unit) in WiMAX or the like.

The relay station may further include a base station communication unit which communicate with the base station, and a terminal communication unit which communicate with the radio communication terminal.

According to this configuration, the relay station functions as a radio communication terminal in case of communicating with the base station. Thus, the relay station can be regarded as a radio communication terminal.

Another representative configuration of an embodiment of the present invention relates to a base station which communicates with a relay station capable of relaying communication between the self-station and a radio communication terminal and with another radio communication terminal, the base station including: an interference reception unit which receives interference information informing that communication between the relay station and the radio communication terminal is receiving interference; a handover information transmission unit which upon receiving the interference information, transmits handover information instructing another radio communication terminal, which is communicating with the self-station, to perform handover to the relay station; and a handover performing unit which performs handover from the self-station to the relay station, in response to a handover request from the another radio communication terminal.

According to this configuration, another radio communication terminal (object of interference), which is causing interference, can be handed over to the relay station, which is communicating with the radio communication terminal receiving the interference. Accordingly, carrier waves of the same frequency are not allocated, so that interference can be avoided. After the handover, communication with the relay station is performed through small transmission power. Thus, even if frequencies of carrier waves used in the radio communication terminal and another radio communication terminal are adjacent to each other, the possibility that they cause interference with each other can be reduced.

The base station may further include a carrier terminal extraction unit which upon receiving the interference information, extracts another radio communication terminal, which is communicating with the self-station, by using a carrier wave of frequency, which is equal or adjacent to a frequency of a carrier wave included in the interference information, and the handover performing unit may transmit the handover information to the radio communication terminal extracted by the carrier terminal extraction unit.

According to this configuration, a radio communication terminal, which is targeted to be prompted for handover, can be limited with frequency, so that load in the handover information transmission unit can be reduced, and unnecessary handover can be suppressed.

The base station may further include a base station power acquisition unit which intermittently acquires transmission power information including transmission power of another radio communication terminal, which is communicating with the self-station, and the handover information transmission unit may transmit the handover information to another radio communication terminal based on the acquired transmission power information.

The vicinity of the relay station is regarded as being distant from the base station. Accordingly, there is a high possibility that a radio communication terminal, which is distant from the base station, namely, which has high transmission power, is causing interference. In the present invention, a radio communication terminal, which is targeted to be prompted for handover, can be limited with transmission power. Thus, load in the handover information transmission unit can be reduced, and unnecessary handover can be reduced.

The base station may further include an antenna having the adaptive array function; a relay direction acquisition unit which acquires relay direction information representing a direction of the relay station by using the adaptive array function; and a terminal direction acquisition unit which acquires terminal direction information indicating a direction of another radio communication terminal, which is communicating with the self-station, by using the adaptive array function, and the handover information transmission unit may transmit the handover information to another radio communication terminal located in substantially the same direction as the direction of the relay station.

According to this configuration, the radio communication terminal, which is targeted to be prompted for handover, can be limited with the direction from the base station, so that load in the handover information transmission unit can be reduced, and unnecessary handover can be reduced.

Another representative configuration of an embodiment of the present invention relates to a radio communication system including a radio communication terminal, a base station capable of performing radio communication with the radio communication terminal, and a relay station capable of relaying communication between the radio communication terminal and the base station. The relay station includes a communication quality acquisition unit which, when communication between the radio communication terminal and the base station is relayed, acquires communication quality in communication between the self-station and the radio communication terminal, an interference determination unit which determines whether the communication between the self-station and the radio communication terminal is receiving interference, based on the acquired communication quality, and an interference notification unit which if it is determined that the communication is receiving interference, notifies the base station of interference information informing of the interference, in order to prompt handover of the radio communication terminal, which is communicating with the base station. The base station includes an interference reception unit which receives the interference information, a handover information transmission unit which upon receiving the interference information, transmits handover information instructing another radio communication terminal, which is communicating with the self-station, to perform handover to the relay station, and a handover performing unit which performs handover from the self-station to the relay station, in response to a handover request from another radio communication terminal.

Another representative configuration of an embodiment of the present invention relates to a radio communication method using a radio communication terminal, a base station capable of performing radio communication with the radio communication terminal, and a relay station capable of relaying communication between the radio communication terminal and the base station. When communication between the radio communication terminal and the base station is relayed, the relay station acquires communication quality in communication between the self-station and the radio communication terminal, and determines whether the communication between the self-station and the radio communication terminal is receiving interference, based on the acquired communication quality, and if it is determined that the communication is receiving interference, in order to prompt handover of the radio communication terminal, which is communicating with the base station, the relay station notifies the base station of interference information informing of the interference. Upon receiving the interference information, the base station transmits handover information instructing another radio communication terminal, which is communicating with the self-station, to perform handover to the relay station, and performs handover from the self-station to the relay station, in response to a handover request from another radio communication terminal.

Another representative configuration of an embodiment of the present invention relates to a relay station capable of relaying communication between a radio communication terminal and a base station includes: a terminal communication unit which communicates with a radio communication terminal; a base station communication unit which communicates with a base station; and an inside and outside determination unit which when receiving a communication connection request from a radio communication terminal, determines whether the radio communication terminal, which has made the communication connection request, is within a predetermined area, wherein the terminal communication unit preferentially establishes communication with the radio communication terminal which is determined by the inside and outside determination terminal as being within the predetermined area. The predetermined area is preferably the inside of a building or a moving object, in which the relay station is installed.

According to this configuration, it is possible to preferentially establish communication with the radio communication terminal located in the predetermined area, in which the relay station is installed (for example, the inside of a building or a moving object, in which the relay station is installed). Accordingly, it is possible to avoid the circumstance that the relay station is occupied by a radio communication terminal located outside the predetermined area (outside a building or a moving object, in which the relay station is installed), so that the original purpose of the relay station as a relay device for relaying communication between the radio communication terminal in the predetermined area and the base station can be accomplished.

The relay station may further include a call number determination unit which when receiving a communication connection request from a radio communication terminal, determines whether a number of radio communication terminals, which are communicating with the self-station, exceeds a first predetermined number, and if the number of radio communication terminals, which are communicating with the self-station, exceeds the first predetermined number, the terminal communication unit may refuse establishment of communication with a radio communication terminal, which is determined as being not within the predetermined area.

Accordingly, in case of being in communication with radio communication terminals exceeding the first predetermined number, establishment of communication with a radio communication terminal, which is not within the predetermined area (e.g., the inside of a moving object or a building), namely, which is located outside the predetermined area (e.g., outside a moving object or a building) can be refused. In other words, in case of being in communication with radio communication terminals exceeding the first predetermined number, it is possible to allow only communication with a radio communication terminal located in the predetermined area.

Accordingly, it is possible to prevent the number of radio communication terminals, which can communicate with the relay station, from being limited by radio communication terminals located outside the predetermined area.

The call number determination unit of the relay station may further determine whether the number of radio communication terminals, which are communicating with the self-station, exceeds a second predetermined number larger than the first predetermined number, the inside and outside determination unit may also determine whether radio communication terminals, which are in established communication, include a radio communication terminal, which is not within the predetermined area, and if the number of radio communication terminals, which are communicating with the self-station, exceeds the second predetermined number, the terminal communication unit may prompt a radio communication terminal, which is determined as being not within the predetermined area, and is in established communication, to be handed over to another base station.

Accordingly, when communication with radio communication terminals exceeding the second predetermined number larger than the first predetermined number is being established, it is possible to exclude communication between a radio communication terminal, which is not within the predetermined area, namely, which is located outside the predetermined area, and the relay station, among the radio communication terminals, which are in established communication. Accordingly, the relay station can secure communicable radio communication terminals as many as the number of the disconnected radio communication terminals outside the predetermined area, and can allocate them to radio communication terminals within the predetermined area.

The relay station may further include a direction storage unit which stores information specifying a direction representing the predetermined area and a direction representing an outside of the predetermined area, and an antenna having an adaptive array function integrally or separately, and if the direction of the radio communication terminal, which has made a communication connection request, as obtained by the adaptive array function is included in the direction representing the predetermined area stored in the direction storage unit, the inside and outside determination unit may determine that the terminal is within the predetermined area.

By using the adaptive array function, it is possible to exactly obtain the direction of the radio communication terminal. The relay station simply compares the direction obtained by the adaptive array function, with the direction representing the predetermined area and the direction representing the outside of the predetermined area stored in advance, such that it is possible to easily and reliably determine whether the terminal is in the predetermined area.

The relay station relays communication between a radio communication terminal located at a place where direct communication with a base station is difficult, such as inside a moving object or a building, and a base station. As such, there are many cases where the relay station is installed by the window of a building or others, namely, at a boundary between the inside of a moving object or a building and the outside of the moving object or the building. Accordingly, if the direction representing the inside of a moving object or a building and the direction representing the outside of the moving object or the building for an installation place of the relay station and installed equipment are stored in advance, even if the distance from the relay station to the radio communication terminal is arbitrary, it can be easily determined whether the terminal is located inside a moving object or a building, as long as the direction of the radio communication terminal can be extracted.

The relay station may further include an area storage unit which stores predetermined area information indicating a range of the predetermined area, and a location information reception unit which receives location information acquired by the radio communication terminal from a GPS satellite, and the inside and outside determination unit may determine whether a radio communication terminal, which has made a communication connection request, is within the predetermined area, based on the location information received from the radio communication terminal.

Accordingly, it can be determined whether the radio communication terminal is inside a moving object or a building, depending on whether the radio communication terminal is located within the predetermined area, which is defined by the self-station. In this case, for the location of the self-station, location information of the self-station may be acquired from the GPS satellite, or if the self-station is installed and fixed in a building or others, location information is preferably registered in advance at installing time.

If the radio communication terminal is inside a moving object or a building, location information cannot be acquired from the GPS satellite. Accordingly, the inside and outside determination unit may determine whether the radio communication terminal is outside the moving object or the building, depending on whether the location information reception unit receives location information before a predetermined time.

The relay station may further include two or more relay station GPS reception units which receive location information from the GPS satellite, respectively, and predetermined area information stored in the area storage unit may be determined based on relative location to the two or more relay station GPS reception units.

According to this configuration where the predetermined area, which is defined by the self-station, is determined based on the relative location to the two or more relay station GPS reception units of the self-station, even if the relay station is installed in a moving object including a vehicle, into which a person can take, such as a car, a bus, a subway (train), a vessel, and an airplane, the range of the predetermined area (the inside of a moving object) can be easily and reliably defined.

The relay station may further include a location information reception unit which receives location information acquired by the radio communication terminal from the GPS satellite, and if a distance between the radio communication terminal and the self-station, which is obtained from the location information received from the radio communication terminal and the location information of the self-station is more than a predetermined value, the inside and outside determination unit may determine that the radio communication terminal is outside the predetermined area.

Accordingly, it is possible to recognize that the radio communication terminal cannot exist in the predetermined area depending on the distance between the relay station (self-station) and the radio communication terminal, so that it is possible to easily and quickly determine whether the radio communication terminal is inside a moving object or a building.

Another representative configuration of the embodiments of the present invention relates to a radio communication method using a relay station capable of relaying communication between a radio communication terminal and a base station, wherein when there is a communication connection request from a radio communication terminal, it is determined whether the radio communication terminal, which has made the communication connection request, is in the predetermined area, and communication with the radio communication terminal, which is determined to be in the predetermined area, is preferentially established.

The components that is described based on the technical concept of the relay station and explanation thereof are applicable to a base station, a radio communication system and a relay method.

The present application is based on Japanese Patent Application Nos. 2008-214721 filed on Aug. 23, 2008 and Japanese Patent Application No. 2008-214724 filed on Aug. 23, 2008, the disclosure of which is herein incorporated by reference.

INDUSTRIAL APPLICABILITY

The present invention can be used for a relay station capable of relaying communication between a radio communication terminal and a base station, a base station, a radio communication system, and a radio communication method.

DESCRIPTION OF REFERENCE NUMERALS

100 . . . radio communication system
110 . . . wireless communication terminal
120 . . . base station
130, 600, 800, 850 . . . relay station
140 . . . communication network
150 . . . relay sever
160 . . . building
210 . . . terminal control unit
212 . . . terminal memory
214 . . . display unit
216 . . . operation unit
218 . . . voice input unit
220 . . . voice output unit
222 . . . terminal wireless communication unit
230 . . . handover request unit
310 . . . base station control unit
312 . . . base station memory
314 . . . base station wireless communication unit
316 . . . base station wired communication unit
318 . . . antenna
320 . . . interference reception unit
322 . . . carrier terminal extraction unit
324 . . . handover information transmission unit
326 . . . base station power acquisition unit
328 . . . relay direction acquisition unit
330 . . . terminal direction acquisition unit
332 . . . handover performing unit
410, 610 . . . relay station control unit
412, 612, 812 . . . relay station memory
414, 614, 814 . . . relay station wireless communication unit
416, 620, 820 . . . terminal communication unit
418, 622 . . . base station communication unit
420 . . . communication quality acquisition unit
422 . . . interference determination unit
424 . . . interference notification unit
426 . . . relay power acquisition unit
428, 634 . . . call number determination unit
430 . . . terminal extraction unit
432 . . . command notification unit
616 . . . antenna
630 . . . direction storage unit
632 . . . inside and outside determination unit
822 . . . area storage unit
824 . . . location information receiving unit
830 . . . GPS satellite
852 . . . relay station GPS reception unit

The invention claimed is:

1. A relay station capable of relaying communication between a radio communication terminal and a base station, the relay station comprising:
a communication quality acquisition unit which, when communication between the radio communication terminal and the base station is relayed, acquires communication quality in communication between the self-station and the radio communication terminal;
an interference determination unit which determines whether the communication between the self-station and the radio communication terminal is receiving interference based on the acquired communication quality; and
an interference notification unit which, if it is determined that the communication is receiving interference, notifies the base station of interference information informing of the interference in order to prompt handover of a radio communication terminal, which is communicating with the base station,
wherein if it is determined that the radio communication terminal is receiving interference, the interference notification unit notifies the base station and another base station adjacent to the base station of the interference information informing of the interference in order to prompt handover of an radio communication terminal, which is communicating with the base station, and
wherein the communication quality acquired by the communication quality acquisition unit is an RSSI, and one of an SINR or a CINR.

2. The relay station according to claim 1,
wherein if a relationship of SINR and RSSI or a relationship of CINR and RSSI meets a predetermined condition, the interference determination unit determines that the communication between the self-station and the radio communication terminal is receiving interference.

3. The relay station according to claim 2,
wherein the interference notification unit notifies the base station of the interference information including at least one of a frequency of a carrier wave and a time slot used in the communication between the radio communication terminal and the self-station.

4. The relay station according to claim 3, further comprising:
a relay power acquisition unit which intermittently acquires transmission power information including transmission power of the radio communication terminal, which is communicating with the self-station;
a call number determination unit which, when receiving a communication connection request from a radio communication terminal, which is not communicating with the self-station, determines whether a number of calls in communication with the self-station exceeds a predetermined number;
a terminal extraction unit which, if it is determined that the number of calls exceeds the predetermined number, extracts a radio communication terminal based on the transmission power information acquired by the relay power acquisition unit; and
a command notification unit which notifies the base station of command information to prompt handover of the extracted radio communication terminal.

5. The relay station according to claim 4, further comprising:
a base station communication unit which communicates with the base station;
a terminal communication unit which communicates with the radio communication terminal.

6. A relay station capable of relaying communication between a radio communication terminal and a base station, the replay station comprising:
- a terminal communication unit which communicates with the radio communication terminal;
- a base station communication unit which communicates with the base station;
- an inside and outside determination unit which, when receiving a communication connection request from a radio communication terminal, determines whether the radio communication terminal, which has made the communication connection request, is within a predetermined area; and
- a call number determination unit which, when receiving a communication connection request from a radio communication terminal, determines whether the number of radio communication terminals, which are communicating with the self-station, exceeds a first predetermined number,
- wherein the terminal communication unit preferentially establishes communication with the radio communication terminal, which is determined by the inside and outside determination terminal as being within the predetermined area, and
- wherein if the number of radio communication terminals, which are communicating with the self-station, exceeds the first predetermined number, the terminal communication unit refuses establishment of communication with a radio communication terminal, which is determined as being not within the predetermined area.

7. The relay station according to claim 6,
- wherein the call number determination unit further determines whether the number of radio communication terminals, which are communicating with the self-station, exceeds a second predetermined number larger than the first predetermined number,
- wherein the inside and outside determination unit further determines whether radio communication terminals which are in established communication include a radio communication terminal which is not within the predetermined area, and
- wherein if the number of radio communication terminals, which are communicating with the self-station, exceeds the second predetermined number, the terminal communication unit prompts a radio communication terminal, which is determined as being not within the predetermined area, and which is in established communication, to perform handover to another base station.

8. The relay station according to claim 7, further comprising:
- a direction storage unit which stores information specifying a direction representing the predetermined area and a direction representing an outside of the predetermined area, and
- an antenna having an adaptive array function,
- wherein the direction storage unit and the antenna are provided integrally or separately, and
- wherein if a direction of the radio communication terminal, which has made a communication connection request, as obtained by the adaptive array function is included in the direction representing the predetermined area stored in the direction storage unit, the inside and outside determination unit determines that radio communication terminal is within the predetermined area.

9. The relay station according to claim 7, further comprising:
- an area storage unit which stores predetermined area information indicating a range of the predetermined area; and
- a location information reception unit which receives location information acquired by the radio communication terminal from a GPS satellite,
- wherein the inside and outside determination unit determines whether a radio communication terminal, which has made a communication connection request, is within the predetermined area, based on the location information received from the radio communication terminal.

10. The relay station according to claim 9, further comprising:
- two or more relay station GPS reception units which receive location information from the GPS satellite, respectively,
- wherein the predetermined area information stored in the area storage unit is determined based on a relative location of the two or more relay station GPS reception units.

11. The relay station according to claim 7, further comprising:
- a location information reception unit which receives location information acquired by the radio communication terminal from the GPS satellite,
- wherein if a distance between the radio communication terminal and the self-station, which is obtained from the location information received from the radio communication terminal and the location information of the self-station is more than a predetermined value, the inside and outside determination unit determines that the radio communication terminal is outside the predetermined area.

12. The relay station according to claim 11,
- wherein the predetermined area is an inside of a building or an a moving object where the relay station is installed.

13. A relay station capable of relaying communication between a radio communication terminal and a base station, the relay station comprising:
- a communication quality acquisition unit which, when communication between the radio communication terminal and the base station is relayed, acquires communication quality in communication between the self-station and the radio communication terminal;
- an interference determination unit which determines whether the communication between the self-station and the radio communication terminal is receiving interference based on the acquired communication quality;
- an interference notification unit which, if it is determined that the communication is receiving interference, notifies the base station of interference information informing of the interference in order to prompt handover of a radio communication terminal, which is communicating with the base station;
- a terminal communication unit which communicates with a radio communication terminal;
- a base station communication unit which communicates with the base station; and
- an inside and outside determination unit which when receiving a communication connection request from a radio communication terminal, determines whether the radio communication terminal, which has made the communication connection request, is within a predetermined area,
- wherein the terminal communication unit preferentially establishes communication with the radio communication terminal, which is determined by the inside and outside determination terminal as being within the predetermined area.

14. The relay station according to claim 13, wherein if it is determined that the radio communication terminal is receiving interference, the interference notification unit notifies the base station and another base station adjacent to the base station of the interference information informing of the interference, in order to prompt handover of an radio communication terminal, which is communicating with the base station.

15. The relay station according to claim 14, wherein the communication quality acquired by the communication quality acquisition unit is an RSSI, and one of an SINR or a CINR.

16. The relay station according to claim 15, wherein if a relationship of SINR and RSSI or a relationship of CINR and RSSI meets a predetermined condition, the interference determination unit determines that the communication between the self-station and the radio communication terminal is receiving interference.

17. The relay station according to claim 16, wherein the interference notification unit notifies the base station of the interference information including at least one of a frequency of a carrier wave and a time slot used in the communication between the radio communication terminal and the self-station.

18. The relay station according to claim 17, further comprising:
a relay power acquisition unit which intermittently acquires transmission power information including transmission power of the radio communication terminal, which is communicating with the self-station;
a call number determination unit which, when receiving a communication connection request from a radio communication terminal, which is not communicating with the self-station, determines whether a number of calls in communication with the self-station exceeds a predetermined number;
a terminal extraction unit which, if it is determined that the number of calls exceeds the predetermined number, extracts a radio communication terminal based on the transmission power information acquired by the relay power acquisition unit; and
a command notification unit which notifies the base station of command information to prompt handover of the extracted radio communication terminal,
wherein if the number of radio communication terminals, which are communicating with the self-station, exceeds the first predetermined number, the terminal communication unit refuses establishment of communication with a radio communication terminal, which is determined as being not within the predetermined area.

19. The relay station according to claim 18, wherein the call number determination unit further determines whether the number of radio communication terminals, which are communicating with the self-station, exceeds a second predetermined number larger than the first predetermined number,
wherein the inside and outside determination unit further determines whether radio communication terminals which are in established communication include a radio communication terminal which is not within the predetermined area, and
wherein if the number of radio communication terminals, which are communicating with the self-station, exceeds the second predetermined number, the terminal communication unit prompts a radio communication terminal, which is determined as being not within the predetermined area, and which is in established communication, to perform handover to another base station.

20. The relay station according to claim 19, further comprising:
a direction storage unit which stores information specifying a direction representing the predetermined area and a direction representing an outside of the predetermined area, and
an antenna having an adaptive array function,
wherein the direction storage unit and the antenna are provided integrally or separately, and
wherein if a direction of the radio communication terminal, which has made a communication connection request, as obtained by the adaptive array function is included in the direction representing the predetermined area stored in the direction storage unit, the inside and outside determination unit determines that radio communication terminal is within the predetermined area.

21. The relay station according to claim 19, further comprising:
an area storage unit which stores predetermined area information indicating a range of the predetermined area; and
a location information reception unit which receives location information acquired by the radio communication terminal from a GPS satellite,
wherein the inside and outside determination unit determines whether a radio communication terminal, which has made a communication connection request, is within the predetermined area, based on the location information received from the radio communication terminal.

22. The relay station according to claim 21, further comprising:
two or more relay station GPS reception units which receive location information from the GPS satellite, respectively,
wherein the predetermined area information stored in the area storage unit is determined based on a relative location of the two or more relay station GPS reception.

23. The relay station according to claim 19, further comprising:
a location information reception unit which receives location information acquired by the radio communication terminal from the GPS satellite,
wherein if a distance between the radio communication terminal and the self-station, which is obtained from the location information received from the radio communication terminal and the location information of the self-station is more than a predetermined value, the inside and outside determination unit determines that the radio communication terminal is outside the predetermined area.

24. The relay station according to claim 23, wherein the predetermined area is an inside of a building or an a moving object where the relay station is installed.

25. A base station which communicates with a relay station capable of relaying communication between the self-station and a radio communication terminal and with another radio communication terminal, the base station comprising:
an interference reception unit which receives interference information informing that communication between the relay station and the radio communication terminal is receiving interference;
a handover information transmission unit which, upon receiving the interference information, transmits handover information instructing another radio communication terminal, which is communicating with the self-station, to perform handover to the relay station;

a handover performing unit which performs handover from the self-station to the relay station, in response to a handover request from the another radio communication terminal; and a carrier terminal extraction unit which, upon receiving the interference information, extracts another radio communication terminal, which is communicating with the self-station, by using a carrier wave of a frequency, which is equal or adjacent to a frequency of a carrier wave included in the interference information, wherein the handover performing unit transmits the handover information to the radio communication terminal extracted by the carrier terminal extraction unit.

26. The base station according to claim 25, further comprising:

a base station power acquisition unit which intermittently acquires transmission power information including transmission power of another radio communication terminal, which is communicating with the self-station, wherein the handover information transmission unit transmits the handover information to another radio communication terminal based on the acquired transmission power information.

27. The base station according to claim 26, further comprising:

an antenna having an adaptive array function;

a relay direction acquisition unit which acquires relay direction information representing a direction of the relay station by using the adaptive array function; and a terminal direction acquisition unit which acquires terminal direction information representing a direction of another radio communication terminal, which is communicating with the self-station, by using the adaptive array function, and wherein the handover information transmission unit transmits the handover information to another radio communication terminal located in substantially the same direction as the direction of the relay station.

* * * * *